US008583647B2

(12) United States Patent
Kawanishi et al.

(10) Patent No.: US 8,583,647 B2
(45) Date of Patent: Nov. 12, 2013

(54) DATA PROCESSING DEVICE FOR AUTOMATICALLY CLASSIFYING A PLURALITY OF IMAGES INTO PREDETERMINED CATEGORIES

(75) Inventors: Ryouichi Kawanishi, Kyoto (JP); Tsutomu Uenoyama, Osaka (JP); Akira Ishida, Tokyo (JP)

(73) Assignee: Panasonic Corporation, Osaka (JP)

( * ) Notice: Subject to any disclaimer, the term of this patent is extended or adjusted under 35 U.S.C. 154(b) by 264 days.

(21) Appl. No.: 13/146,253

(22) PCT Filed: Dec. 24, 2010

(86) PCT No.: PCT/JP2010/007518
§ 371 (c)(1),
(2), (4) Date: Jul. 26, 2011

(87) PCT Pub. No.: WO2011/092793
PCT Pub. Date: Aug. 4, 2011

(65) Prior Publication Data
US 2012/0117069 A1      May 10, 2012

(30) Foreign Application Priority Data

Jan. 29, 2010  (JP) .................................. 2010-018035

(51) Int. Cl.
*G06F 17/30* (2006.01)
(52) U.S. Cl.
USPC ............................. 707/737; 707/913; 706/20
(58) Field of Classification Search
USPC .......... 707/736, 737, 740, 913–916, 999.007, 707/999.107
See application file for complete search history.

(56) References Cited

U.S. PATENT DOCUMENTS 6,826,576 B2 * 11/2004 Lulich et al. ................... 707/740
6,993,535 B2 * 1/2006 Bolle et al. ............................ 1/1
(Continued)

FOREIGN PATENT DOCUMENTS

CN         101351149          1/2009
JP         2004-185259        7/2004
(Continued)

OTHER PUBLICATIONS

Fujiyoshi Hironobu, "Gradient-Based Feature Extraction: SIFT and HOG" (Information Processing Society of Japan, Research paper CVIM160, pp. 211-224, 2007, together with verification and full translation.

(Continued)

*Primary Examiner* — Leslie Wong
(74) *Attorney, Agent, or Firm* — Wenderoth, Lind & Ponack, L.L.P.

(57) ABSTRACT

A data processing device provides a result of categorization that is satisfactory to a user. The data processing device: stores model data pieces indicating detection counts of feature amounts; judges, for each target data piece, whether the target data piece is a non-categorization data piece including an uncategorizable object, using the model data pieces and the detection count of each of at least two feature amounts detected in the target data piece; when two or more of the target data pieces are judged to be non-categorization data pieces, specifies at least two feature amounts that are included and detected the same number of times, in a predetermined number or more of the non-categorization data pieces; and newly creates a model data piece based on the at least two specified feature amounts, using a class creation method, and stores the model data piece into the storage unit.

16 Claims, 18 Drawing Sheets

(56) References Cited

U.S. PATENT DOCUMENTS

| | | |
|---|---|---|
| 7,783,085 B2 * | 8/2010 | Perlmutter et al. ........... 382/118 |
| 8,015,490 B2 * | 9/2011 | Ogikubo ....................... 715/716 |
| 8,037,036 B2 * | 10/2011 | Blumenau et al. ............ 707/694 |
| 8,170,280 B2 * | 5/2012 | Zhao et al. .................... 382/103 |
| 8,392,414 B2 * | 3/2013 | Aucouturier et al. ......... 707/736 |
| 2004/0042661 A1 | 3/2004 | Ulrich et al. |
| 2007/0165932 A1 | 7/2007 | Nishimura et al. |
| 2008/0089591 A1 | 4/2008 | Zhou et al. |
| 2008/0279456 A1 * | 11/2008 | Kasahara et al. ............. 382/190 |
| 2008/0320046 A1 * | 12/2008 | Watabe et al. ............. 707/104.1 |
| 2010/0172591 A1 * | 7/2010 | Ishikawa ....................... 382/224 |
| 2010/0272365 A1 * | 10/2010 | Yamamoto et al. ........... 382/190 |
| 2011/0085710 A1 * | 4/2011 | Perlmutter et al. ........... 382/118 |
| 2011/0191286 A1 * | 8/2011 | Cho et al. ..................... 707/603 |
| 2011/0255757 A1 | 10/2011 | Nishimura et al. |
| 2011/0255758 A1 | 10/2011 | Nishimura et al. |
| 2011/0255759 A1 | 10/2011 | Nishimura et al. |
| 2012/0011433 A1 * | 1/2012 | Skrenta et al. ................ 715/234 |
| 2012/0311434 A1 * | 12/2012 | Skrenta et al. ................ 715/234 |
| 2013/0028522 A1 * | 1/2013 | Perlmutter et al. ........... 382/197 |
| 2013/0097542 A1 * | 4/2013 | Icho et al. ..................... 715/769 |

FOREIGN PATENT DOCUMENTS

| | | |
|---|---|---|
| JP | 2008-90698 | 4/2008 |
| JP | 2008-97607 | 4/2008 |
| JP | 2009-104666 | 5/2009 |
| JP | 2010-3177 | 1/2010 |

OTHER PUBLICATIONS

Hyoung-Gook Kim et al., "MPEG-7 Audio and Beyond", John Wiley & Sons, Ltd., 2005.

International Search Report issued Apr. 5, 2011 in International (PCT) Application No. PCT/JP2010/007518.

Taichi Joutou and Keiji Yanai, Web Image Classification with Bag-of-Keypoints, IPSJ SIG Technical Rport, vol. 2007, No. 42, pp. 201-208, May 15, 2007, together with verified English translation.

* cited by examiner

| Type of data | Categorization start amount reference parameter ||||
|---|---|---|---|---|
| | Criterion 1 | Criterion 2 | Criterion 3 | ... |
| Still image | 100 | 20% of still images | 10% of all data | ... |
| Moving image | 10 | 30% of moving images | 7% of all data | ... |
| Audio | 50 | 50% of audio | 15% of all data | ... |
| TV video image | 25 | 15% of video images | 3% of all data | ... |
| ... | ... | ... | ... | ... |

| Type of data | Types of reference parameters ||||
|---|---|---|---|---|
| | Frequency criterion | Peak value criterion 1 | Peak value criterion 2 | ... |
| Still image | 0.35 | 0.5 | 0.4 | ... |
| Moving image | 0.22 | 0.45 | 0.55 | ... |
| Audio | 0.32 | 0.35 | 0.45 | ... |
| TV video image | 0.17 | 0.2 | 0.3 | ... |
| ... | ... | ... | ... | ... |

DATA PROCESSING DEVICE FOR AUTOMATICALLY CLASSIFYING A PLURALITY OF IMAGES INTO PREDETERMINED CATEGORIES

TECHNICAL FIELD

The present invention relates to an image processing technique for automatically classifying a plurality of images into predetermined categories.

BACKGROUND ART

In recent years, cameras for capturing subject images, such as DSC (Digital Still Cameras), mobile telephones equipped with a camera, and digital movie cameras, have been widely prevalent. Furthermore, recording media for saving image data have been increasingly larger in size. This enables individual users to keep a large number of AV (Audio Video) contents, such as images or moving images. However, the users are forced to spend a significant amount of time and effort to find an image or a moving image as desired, from a large number of images and moving images.

One conventional technique to help the users to efficiently find a desired image is an image indexing technique for automatically tagging images to organize the images.

There are various methods provided as the image indexing technique for automatically tagging images. For example, tagging is performed by: estimating an event based on time information and place information; detecting a specific object with use of a face detection technique; or detecting similar images based on similarity in color information or texture information. Tags corresponding to images are used when searching the images. However, images captured in various places include different objects and scenes. Accordingly, there has been proposed an image indexing technique for recognizing or categorizing general objects.

According to a conventional technique for recognizing general objects, a model is created for an object in an image, based on (i) a basic feature amount in the image, such as a brightness value, and (ii) a group of local feature amounts. Then, feature amounts detected from an image are compared with the feature amounts of the model to determine whether the feature amounts match those of the model. This technique for recognizing general objects is generally used in many computer vision applications. Another known technique is to provide a device for generating feature vectors each representing an input image. The device processes the feature vectors with use of different classifiers, and automatically categorizes the input images based on a combination of resultant data pieces output from the classifiers. In this way, a large number of images are recognized accurately and at high speed, compared to conventional technologies (see Patent Literature 1, for example). This method enables calculating a feature of an object at high speed from various perspectives.

Yet another known technique is to search for an object by automatically learning a hierarchical object recognition model of the object, focusing on the fact that the object moves and changes variously. The hierarchical object recognition model is constituted by a plurality of parts of the object which are mutually movable based on each other's movements, with use of an arbitrary method (see Patent Literature 2).

CITATION LIST

[Patent Literature]
 [Patent Literature 1]
 Japanese Patent Application Publication No. 2008-97607
 [Patent Literature 2]
 Japanese Patent Application Publication No. 2009-104666

SUMMARY OF INVENTION

Technical Problem

Generally, the image indexing technologies described above are based on the premise that images are categorized with use of models defining general objects, rather than models specific to the data of a user. According to the structure disclosed in Patent Literature 1, for example, feature vectors calculated from an image are processed by the classifiers, and weighted data pieces are output from the classifiers. The image is categorized based on a combination of the weighted data pieces. Therefore, according to this structure, a device can effectively categorize objects within a definable range, but does not have a processing ability to categorize all general objects. This means that the device according to this structure cannot always detect undefined objects, objects important to a user, and the like.

In other words, according to the conventional technologies, objects specific to user data cannot always be categorized. Therefore, a result of categorization may not always be satisfactory to the user.

The present invention has been achieved in view of the above problem, and an aim thereof is to provide a data processing device, an image processing method, a program, and an integrated circuit that provide a result of categorization that is satisfactory to a user, even when user data includes an object specific to the user.

Solution to Problem

In order to achieve the above aim, the present invention provides a data processing device for categorizing objects included in target data pieces with use of feature amounts of the objects, the data processing device comprising: a storage unit storing therein a plurality of model data pieces used for categorizing the objects, each of the model data pieces indicating detection counts of respective feature amounts, each detection count indicating the number of times the corresponding feature amount is detected; a categorization unit operable to judge, for each target data piece, whether the target data piece is a non-categorization data piece including an object that is uncategorizable, with use of the model data pieces and the detection count of each of at least two feature amounts detected in the target data piece; a specification unit operable when, as a result of judgment by the categorization unit, two or more of the target data pieces are judged to be non-categorization data pieces, to specify at least two feature amounts that are each included, and detected the same number of times, in a predetermined number or more of the non-categorization data pieces; and a model creation unit operable to newly create a model data piece based on the at least two feature amounts specified by the specification unit, with use of a class creation method, and to store the model data piece into the storage unit.

Advantageous Effects of Invention

According to the stated structure, the data processing device specifies the at least two feature amounts that are each included, and detected the same number of times, in the predetermined number or more of the non-categorization data pieces, with use of the two or more non-categorization data pieces. Such specification is possible because the number of non-categorization data pieces including the same object is relatively large. Accordingly, the new model data piece is created based on the at least two feature amounts specified by the specification unit. The new model data piece enables categorization of the non-categorization data pieces including the same object.

Here, the specification unit may acquire, for each non-categorization data piece, the detection counts of similar feature amounts included in the non-categorization data piece, each similar feature amount being similar to any of feature amounts indicated by the model data pieces, generate, for each feature amount, a distribution information piece indicating a distribution of the detection counts of the feature amount, based on the detection counts of the similar feature amounts acquired for the non-categorization data pieces, and specify, from the distribution information pieces, the at least two feature amounts that are each included, and detected the same number of times, in the predetermined number or more of the non-categorization data pieces.

According to the stated structure, the data processing device easily specifies, from the distribution information pieces each indicating the distribution of the detection counts of the corresponding feature amount, the at least two feature amounts that are each included, and detected the same number of times, in the predetermined number or more of the non-categorization data pieces.

Here, the specification unit may divide the non-categorization data pieces into a plurality of data groups in units of predetermined sections and, for each data group, may acquire the detection counts, generate the distribution information pieces, and specify the at least two feature amounts, and the model creation unit may newly create a model data piece for each data group.

According to the stated structure, the data processing device specifies the at least two feature amounts for each predetermined section. This enables categorization of objects included in the respective predetermined sections.

Here, each non-categorization data piece may be associated with a time information piece indicating a date and time at which the non-categorization data piece was created, each of the predetermined sections may be a predetermined time period, and the specification unit may divide the non-categorization data pieces into the data groups in units of the predetermined time periods.

According to the stated structure, the data processing device specifies the at least two feature amounts for each predetermined time period. This is because of the following reason. In general, data having the same object is likely to be created in a similar time period. Therefore, by grouping the non-categorization data pieces by units of such time periods, objects included in the respective time periods are easily categorized.

Here, after newly creating the model data pieces for the data groups, the model creation unit may judge whether first and second data pieces are correlated in a time sequence, the first model data piece being created for one of the data groups, the second model data piece being created for another one of the data groups, and when judging affirmatively, may associate the first model data piece with the second model data piece as model data pieces having a secular change.

According to the stated structure, when the first and the second model data pieces each created for a different data group are correlated in a time sequence, the data processing device associates the first model data piece with the second model data piece as model data pieces having a secular change. In this way, data pieces categorized based on these model data pieces are considered to include the same object.

Here, the model creation unit may judge that the first and the second model data pieces are correlated when a degree of temporal change in a first feature amount characterizing the first model data piece is proportional to a degree of temporal change in a second feature amount characterizing the second model data piece.

According to the stated structure, the data processing device judges that the first and the second model data pieces are correlated when a degree of temporal change in the first feature amount is proportional to a degree of temporal change in the second feature amount. This enables easily specifying whether the first and the second model data pieces are correlated.

Here, the model creation unit may store only the first model data piece into the storage unit, when the first model data piece is the same as the second model data piece or when model data pieces each being the same as the first model data piece exist at intervals in remaining model data pieces that are other than the first model data piece.

According to the stated structure, when the first model data piece is the same as the second model data piece, the data processing device stores only the first model data piece into the storage unit. This prevents storing the same model data pieces redundantly.

Here, the specification unit may acquire a calculation frequency of each feature amount with use of all non-categorization data pieces, specify at least one feature amount whose calculation frequency is greater than or equal to a predetermined frequency, and acquire, for each non-categorization data piece, the detection count of each of the at least one feature amount, and may generate the distribution information piece for each feature amount that has been acquired, based on the detection counts of the feature amount.

According to the stated structure, the data processing device specifies, from among the acquired calculation frequencies of the respective feature amounts, at least one feature amount whose calculation frequency is greater than or equal to the predetermined frequency, and acquires the detection count of each of the at least one feature amount. This reduces processing load compared to the case of acquiring the detection counts of all the feature amounts.

Here, the data processing device may further comprise: a display unit operable to display the non-categorization data pieces; and a reception unit operable to receive, from a user, a specification of at least two of the non-categorization data pieces displayed by the display unit, wherein the specification unit may generate the distribution information pieces for the respective feature amounts, based on one of (i) the detection counts of the feature amounts acquired for each of the at least two non-categorization data pieces received by the reception unit and (ii) the detection counts of the feature amounts acquired for each of remaining non-categorization data pieces that are other than the at least two non-categorization data pieces.

According to the stated structure, the data processing device generates the distribution information pieces, based on the detection counts of the feature amounts acquired for each of the at least two non-categorization data pieces specified by the user. This enables creating a model data piece in view of the user's intention.

Here, the reception unit may receive the specification when a new model data piece has not yet been created.

According to the stated structure, the data processing device receives the specification of the non-categorization data pieces for creating a model data piece, when a new model data piece has not yet been created. This enables creating a model data piece more accurately.

Here, the specification unit may divide the at least two non-categorization data pieces into a plurality of data groups in units of time periods, based on a date and time at which each of the at least two non-categorization data pieces was created, the dividing being performed such that each of the dates and times belongs to one of the time periods, and generate the distribution information pieces for each data group.

According to the stated structure, the data processing device generates the distribution information pieces for each time period. In this way, the model creation unit can create a model data piece for each time period.

The data processing device may further comprise: a display unit operable to display a plurality of data pieces estimated to include an object identified by the new model data piece, and a reception unit operable to receive, from a user, a specification of at least two of the data pieces displayed by the display unit, wherein the specification unit may generate, for each feature amount, a different distribution information piece of the detection counts of the feature amount, based on one of (i) the detection counts of the feature amounts acquired for each of the at least two data pieces received by the reception unit and (ii) the detection counts of the feature amounts acquired for each of remaining data pieces that are other than the at least two data pieces, the different distribution information pieces being different from the distribution information pieces generated based on the detection counts acquired for the non-categorization data pieces, and the model creation unit may create a model data piece different from the new model data piece, based on the different distribution information pieces.

According to the stated structure, the data processing device receives, from the user, the specification of at least two data pieces from among the plurality of data pieces estimated to include an object identified by the new model data piece that has been created. Then, the data processing device re-creates a model data piece different from the new model data piece, based on the specified two data pieces. In this way, the data processing device excludes any data piece that includes an object not supposed to be identified by the new model data piece. This enables re-creating a model data piece more accurately.

Here, the target data pieces may be images, and the specification unit may create, for each image including an object that is not identifiable by the model data pieces, a high level feature group at least including a plurality of local feature groups with use of a similarity between at least one feature amount detected in the image and any of the feature amounts indicated by the model data pieces, and may acquire, for each local feature group, the detection count of each similar feature amount.

According to the stated structure, the data processing device creates a new model data piece for the images each including an unidentifiable object. After the new model data piece is created, the data processing device can categorize images specific to the new model data piece.

BRIEF DESCRIPTION OF DRAWINGS

FIG. 5 shows an example of a data structure of a first reference parameter table T100.

FIG. 6 shows an example of a data structure of a second reference parameter table T110.

FIG. 20 is a block diagram showing a structure of a data processing device 100a.

DESCRIPTION OF EMBODIMENTS

The following describes embodiments according to the present invention, with reference to the drawings.

1. Embodiment 1

1.1 Structure of Data Processing Device 100

The following describes Embodiment 1 according to the present invention, with reference to the drawings. The present embodiment relates to a data processing device 100 for automatically organizing local AV (Audio Video) data pieces, such as home-use AV data pieces, and also to a mechanism in which the data processing device 100 creates local categorization models, and automatically and accurately tags the AV data pieces with the local categorization models. In the present embodiment, AV data is a collective term for still image data, moving image data, music data, and the like.

Figure 1:
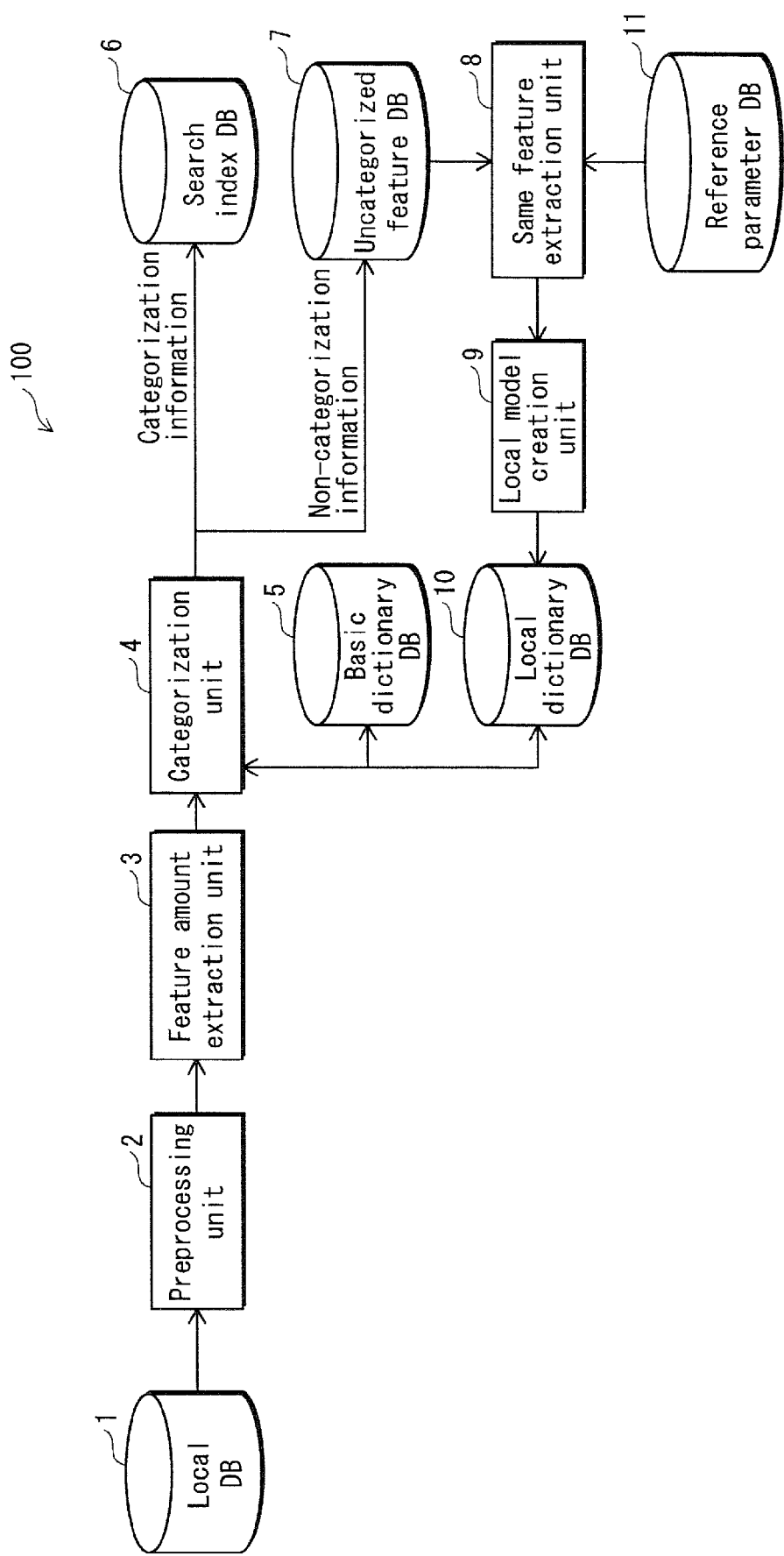
FIG. 1 is a block diagram showing a structure of a data processing device 100.

FIG. 1 is a block diagram showing a structure of the data processing device 100.

As shown in FIG. 1, the data processing device 100 includes a local DB (database) 1, a preprocessing unit 2, a feature amount extraction unit 3, a categorization unit 4, a basic dictionary DB (database) 5, a search index DB (database) 6, an uncategorized feature DB (database) 7, a same feature extraction unit 8, a local model creation unit 9, a local dictionary DB (database) 10, and a reference parameter DB (database) 11.

Specifically, each DB is a large capacity media disc, such as an HDD (Hard Disk Drive) or a DVD (Digital Versatile Disk), or a storage device such as a semiconductor memory.

(1) Local DB 1

The local DB 1 stores therein file data for home use or the like. For example, the local DB 1 stores therein AV (audio video) data, such as still image data, moving image data, and music data.

(2) Preprocessing Unit 2

The preprocessing unit 2 performs processing for facilitating extraction of a feature amount of AV data, before the extraction of the feature amount. Specifically, the preprocessing unit 2 performs the processing of: normalizing AV data; detecting the background and object area of an image by dividing the image into multiple areas; and detecting a scene segment by calculating change in the power of audio.

(3) Feature Amount Extraction Unit 3

The feature amount extraction unit 3 performs processing for extracting a feature amount of AV data. Specifically, when the AV data is image data, the feature amount extraction unit 3 extracts at least one of the following feature amounts: (i) a low level feature amount, such as an edge, color, or texture; (ii) a feature amount descriptor, such as SURF (speeded up robust features) or SIFT (Scale-Invariant Feature Transform), which indicates a feature amount of an area centering a feature point; (iii) a high level feature amount, such as HOG (histogram of oriented gradient), which indicates a feature pertaining to the shape of an object; and the like. Details of the aforementioned processing are described in "Gradient-Based Feature Extraction: SIFT and HOG" (Information Processing Society of Japan, Research Paper CVIM160, pp. 211-224, 2007) written by Fujiyoshi Hironobu.

When the AV data is audio data, the feature amount extraction unit 3 extracts at least one of the following feature amounts: audio power; zero crossing; a spectrum-related feature amount; a cepstrum-related feature amount, a chroma vector; and the like. Examples of the spectrum-related feature amount and the cepstrum-related feature amount include spectral roll-off, MFCC (Mel Frequency Cepstrum Coefficient), etc. There are also a number of features specified as MPEG-7 audio features in the MPEG-7 (Moving Picture Experts Group Phase 7) standard. Low-level feature amounts include Audio Power, Audio Spectrum Envelope, Audio Spectrum Centroid, Harmonic Spectral Deviation, Harmonic Spectral Spread, etc. Note that details thereof are described in "MPEG-7 AUDIO AND BEYOND" by Hyoung-Gook Kim et al. (John Wiley & Sons Ltd., 2005).

The following describes a function of the feature amount extraction unit 3 in a case where the AV data is image data.

The feature amount extraction unit 3 includes in advance a dictionary that stores therein a plurality of Visual Words. Each Visual Word is a reference feature amount for extracting a feature.

The feature amount extraction unit 3 extracts at least one feature point in the image, and calculates a SIFT feature amount from the extracted feature point. The feature amount extraction unit 3 generates at least one Bag-of-Features (BoF), with use of each calculated SIFT feature amount and the plurality of Visual Words stored in the dictionary. The feature amount extraction unit 3 outputs, to the categorization unit 4, the at least one BoF that has been generated.

Here, each of the Visual Words is calculated as a dominant model representative in various SIFT feature amounts, and represents all or part of the shape of a general object, such as a person, a house, or an umbrella. Visual Words, extraction of a feature point, calculation of a SIFT feature amount, and generation of a BoF are all well-known technologies. Therefore, descriptions thereof are omitted.

(4) Categorization Unit 4

When AV data is input, the categorization unit 4 performs matching processing to compare the AV data with existing model data, with use of a feature amount extracted from the AV data. Then, the categorization unit 4 performs judgment processing for judging whether the AV data matches any models.

The judgment processing is performed, for example, with use of a discriminator based on a machine learning method. General discriminators include a GMM (Gaussian mixture model) and an SVM (Support Vector Machine).

The categorization unit 4 sets, to the discriminator, categorization reference data prepared in advance for each category. The categorization reference data is, for example, model information accumulated in the basic dictionary DB 5 and the local dictionary DB 10 that are described later. Then, the categorization unit 4 discriminates a category to which the AV data belongs, and calculates likelihood of the discrimination, i.e., a degree of reliability of the discrimination, with use of sample input information. In the present embodiment, the sample input information is the at least one BoF of the AV data. In general, the larger the value of likelihood, the higher the degree of reliability.

When the discriminator matches the AV data with one of the models, the categorization unit 4 associates (tags) the AV data with categorization information of the model, and stores the AV data in the search index DB 6.

When the discriminator does not match the AV data with any of the model data pieces, the categorization unit 4 associates (tags) the AV data with non-categorization information thereof, and stores the AV data in the uncategorized feature DB 7. In the present embodiment, the non-categorization information is an identifier for identifying AV data. For example, when the AV data is an image, the non-categorization information is an image number associated with the image.

(5) Basic Dictionary DB 5

The basic dictionary DB 5 stores therein (i) definitions of categories and (ii) model information pieces of the categories. The definitions are used by the categorization unit 4 to classify AV data pieces into the categories. The model information pieces are necessary for the categorization unit 4 to categorize the AV data pieces. The number of the model information pieces corresponds to the number of feature amounts to be used.

(6) Search Index DB 6

The search index DB 6 stores categorization information of a model. Specifically, when input AV data matches any of the models, the AV data is associated with categorization information pertaining to the model, and is stored in the search index DB 6.

(7) Uncategorized Feature DB 7

The uncategorized feature DB 7 stores non-categorization information of uncategorized AV data.

(8) Same Feature Extraction Unit 8

The same feature extraction unit 8 calculates the similarity of feature amounts, the frequency of appearance of feature amounts, etc. from a plurality of uncategorized AV data pieces, based on non-categorization information stored in the uncategorized feature DB 7. If there exists a certain tendency as a result of calculation, the same feature extraction unit 8 extracts the same feature from among the uncategorized AV data pieces, which is a feature presumably obtainable from the same object.

The same feature extraction unit 8 starts the aforementioned processing when, for example, the categorization unit 4 has started processing for categorization. When the processing for categorization has been started, the same feature extraction unit 8 judges whether the number of non-categorization information pieces accumulated in the uncategorized feature DB 7 is greater than or equal to a predetermined number necessary for starting the processing for extracting the same feature. This judgment is performed, for example, with use of a first reference parameter table T100 stored in the reference parameter DB 11 which is described later.

When judging to perform the extraction processing, the same feature extraction unit 8 extracts a reference feature amount (Visual Word) from each of the AV data pieces indicated by the non-categorization information pieces accumulated in the uncategorized feature DB 7. Specifically, the reference feature amounts targeted for extraction have a calculation frequency greater than or equal to a predetermined frequency. Here, the calculation frequency refers to a frequency of a reference feature amounts being calculated. The calculation frequency $F(x)$ of a type x of reference feature amount is calculated by the following formula 1, where $V_{all}$ denotes the number of all of the AV data pieces; $V_{x,cal}$ denotes the number of AV data pieces from each of which at least one feature amount x has been calculated; $V_{x,one}$ denotes the average number of feature amounts x calculated from each AV data piece including at least one feature amount x.

<Formula 1>

$$F(X) = \log(V_{X,one}) \times (V_{X,cal} \div V_{all})$$ (formula 1)

Subsequently, the same feature extraction unit 8 extracts at least one reference feature amount having a large calculation frequency, with use of a second reference parameter table T110 stored in the reference parameter DB 11 which is described later.

Figure 2:
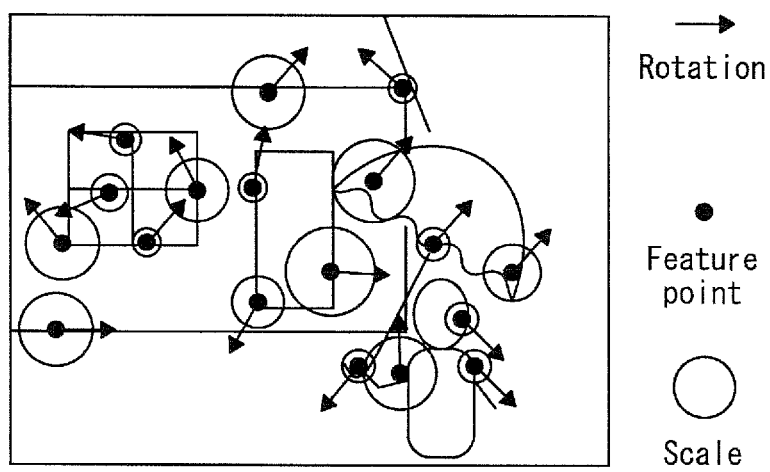
FIG. 2 shows an example of SIFT feature amounts extracted from an image.

Also, the same feature extraction unit 8 calculates, for each AV data piece, the similarity between the feature amounts of the AV data piece and the reference feature amounts. For example, in a case where the reference feature amounts are Visual Words, the same feature extraction unit 8 calculates, as similarity, the distance from the feature amounts of the AV data piece to the models of the Visual Words. The following describes in detail the processing for calculating the similarity, with reference to FIGS. 2 and 3. FIG. 2 shows SIFT feature amounts extracted from a picture showing a person, a house, and an umbrella. Regarding a SIFT feature amount, the same feature extraction unit 8 detects a characteristic point (feature point in the figure) in an image, and calculates a SIFT descriptor that is area information (a scale in the figure) of the characteristic point. Also, a rotation in FIG. 2 indicates a direction according to which the feature area (i.e., scale) of a feature point is rotated. Since the definitions of the feature point, the scale, and the rotation are the same as the definitions in the conventional technique, detailed descriptions thereof are omitted. Also, regarding the calculation of similarity, the same feature extraction unit 8 calculates, for example, Euclidean distance, Mahalanobis distance, Minkowski distance, etc. based on multivariate data of a group having the same feature, and treats the closeness of the distance as similarity. Squared Euclidean distance is employed as a basic distance. When observation values of n objects and m variates of features are obtained, dissimilarity dij, which is the amount indicating dissimilarity between an object i and an object j, is calculated by the following formula 2.

<Formula 2>

$$d_{ij} = \sum_{k=1}^{m} (X_{k,i} - X_{k,j})^2$$ (Formula 2)

As shown in FIG. 2, the same feature extraction unit 8 calculates, for each of the AV data pieces (images) that have not been categorized, all SIFT feature amounts in the AV data piece. Next, as shown in FIG. 3, the same feature extraction unit 8 calculates, for each of the AV data pieces that have not been categorized, detection counts that are each the number of SIFT feature amounts detected to be similar to the corresponding Visual Word.

Figure 4:
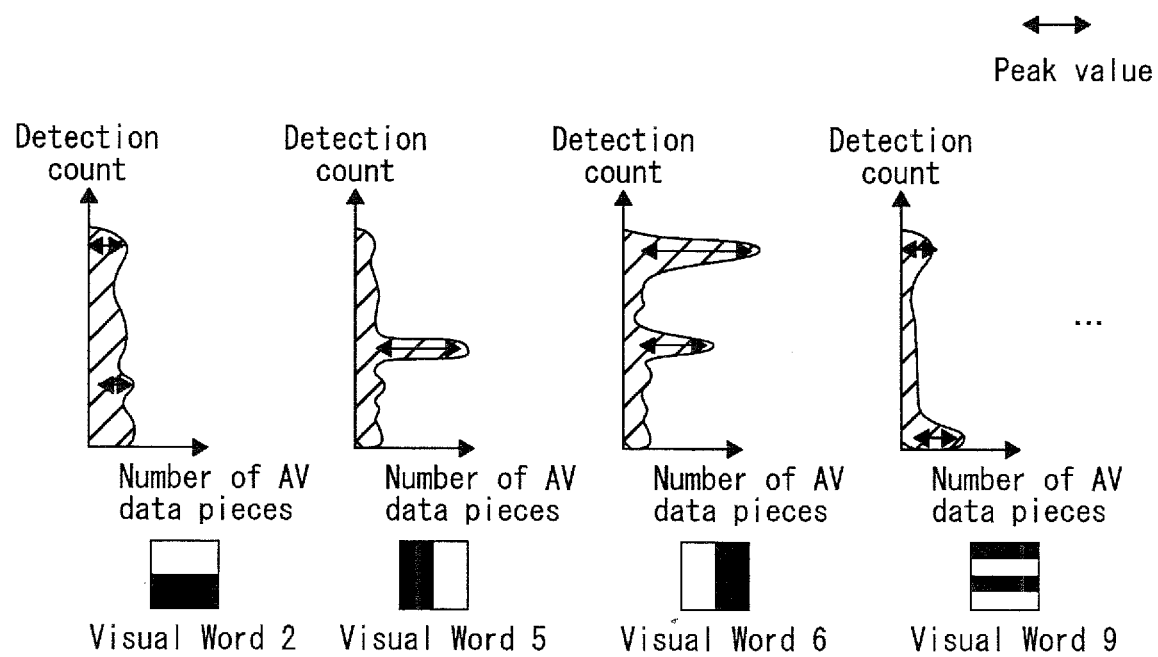
FIG. 4 shows an example of similarity distribution charts, each of which is created for a respective Visual Word extracted from all AV data pieces that have not been categorized, and shows the number of AV data pieces corresponding to each value of detection count.

Then, as shown in FIG. 4, the same feature extraction unit 8 creates, for each reference feature amount extracted as having a large detection count, a similarity distribution chart (i.e., similarity distribution information piece) that shows the detection count of the reference feature amount in each of the AV data pieces that have not been categorized. Subsequently, the same feature extraction unit 8 calculates a peak value in each of the similarity distribution charts. Here, the peak value is calculated as a difference obtained by subtracting, from a local maximum value in each similarity distribution chart, a local minimum value nearest the local maximum value.

The following specifically describes a calculation method of the peak value in the similarity distribution chart of each Visual Word as shown in FIG. 4.

Figure 3:
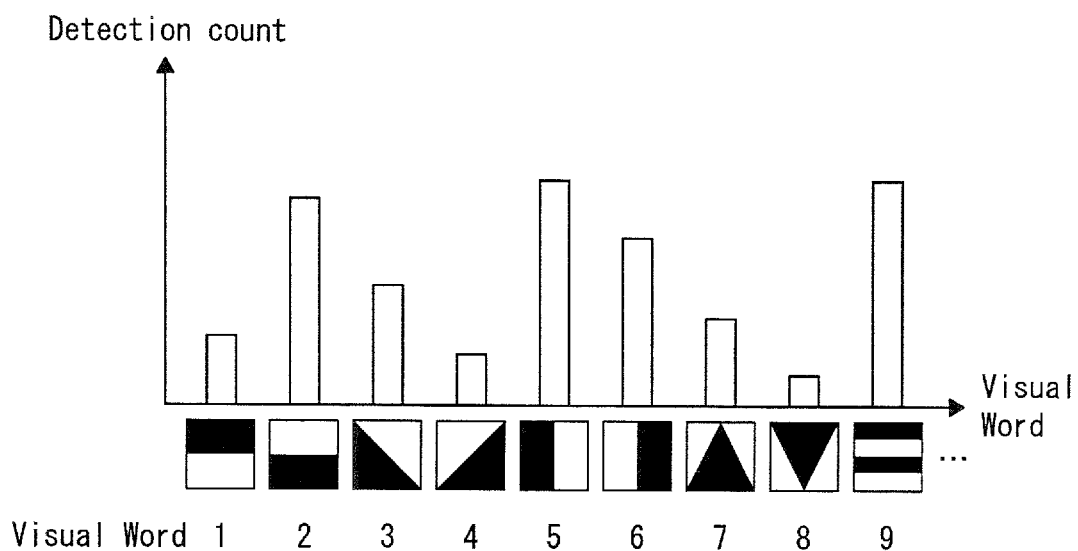
FIG. 3 shows an example of the detection count of each Visual Word extracted from the image.

The same feature extraction unit 8 calculates, for each of the AV data pieces, the detection count of each reference feature amount as shown in FIG. 3. Then, the same feature extraction unit 8 calculates the number of AV data pieces corresponding to each value of detection count, thereby creates a similarity distribution chart where the vertical axis represents a detection count and the horizontal axis represents the number of AV data pieces. The peak value is calculated as follows. First, a local maximum value and a local minimum value nearest the local maximum value are calculated from each similarity distribution chart that shows increase and decrease in the number of AV data pieces. Then, a difference between the local maximum value and the nearest local minimum value is calculated as a peak value by subtracting the local minimum value from the maximum value.

The same feature extraction unit 8 determines, with use of the calculated peak values, a reference feature amount having a peak value based on which the same object can be presumably determined, and extracts the reference feature amount. The same feature extraction unit 8 outputs, to the local model creation unit 9, the extracted reference feature amount as the same feature. The above determination regarding the peak value is performed, for example, based on the second reference parameter table T110 which is described later.

(9) Local Model Creation Unit 9

The local model creation unit 9 defines the category of an object specific to a group of local AV data pieces, with use of the same feature extracted by the same feature extraction unit 8, and calculates model information of the object.

Specifically, the local model creation unit 9 defines a category and creates a model with respect to a similar data group consisting of, from among AV data pieces that have not been categorized, at least one AV data piece from which the same feature has been detected. This processing for defining a category and creating a model is performed with use of the same feature extracted by the same feature extraction unit 8 and a class creation method such as k-means method. Since a class creation method such as the k-means method is a well-known technique, a description thereof is omitted.

(10) Local Dictionary DB 10

The local dictionary DB 10 accumulates, in accordance with feature amounts to be used, the definition of a category calculated by the local model creation unit 9 and model information necessary for classifying AV data under the category. The local dictionary DB 10 is, for example, a large capacity media disc such as an HDD or a DVD, or a storage device such as a semiconductor memory.

(11) Reference Parameter DB 11

The reference parameter DB 11 stores the first reference parameter table T100 and the second reference parameter table T110.

The first reference parameter table T100 indicates criteria for the same feature extraction unit 8 to start processing. The second reference parameter table T110 indicates criteria for extracting (i) a reference feature amount having a large calculation frequency and (ii) a reference feature amount based on a peak value.

(11-1) First Reference Parameter Table T100

As shown in FIG. 5, the first reference parameter table T100 includes at least one pair of a type of data and a reference parameter indicating the amount of data necessary for starting categorization (hereinafter "categorization start amount reference parameter").

The type of data indicates the type of data targeted for categorization. Specifically, examples of the type of data include a still image, a moving image, audio, and so on. The categorization start amount reference parameter includes criterion 1, criterion 2, criterion 3, and so on. The criterion 1, the criterion 2, the criterion 3, and so on indicate, for each type of data, the number (amount) of data pieces necessary for starting categorization.

Suppose that the categorization target is still images. In this case, the same feature extraction unit 8 starts categorization when judging that still images that have not been categorized satisfy any of the criteria 1, 2, and so on.

(11-2) Second Reference Parameter Table T110

As shown in FIG. 6, the second reference parameter table T110 includes at least one pair of a type of data and types of reference parameters.

The type of data indicates the type of data targeted for extraction. Specifically, examples of the type of data include a still image, a moving image, audio, and so on. The types of reference parameters include a frequency criterion, a peak value criterion 1, a peak value criterion 2, and so on. The frequency criterion is used when a reference feature amount having a large calculation frequency is extracted from the corresponding type of data. The peak value criterion 1, the peak value criterion 2, and so on are used when determining, in the corresponding type of data, a reference feature amount with which the same object can be presumably determined.

Suppose that still images are targeted for extracting a reference feature amount having a large calculation frequency. In this case, the same feature extraction unit 8 extracts at least one reference feature amount that satisfies the frequency criterion greater than or equal to 0.35. Also, when a reference feature amount satisfies any of the peak value criterion 1, the peak value criterion 2, and so on, the same feature extraction unit 8 determines that the same object can be presumably determined with use of the reference feature amount.

1.2 Operation

The following describes in detail an operation for creating a local model, which is performed when AV data of a user is automatically tagged so as to be organized.

Figure 7:
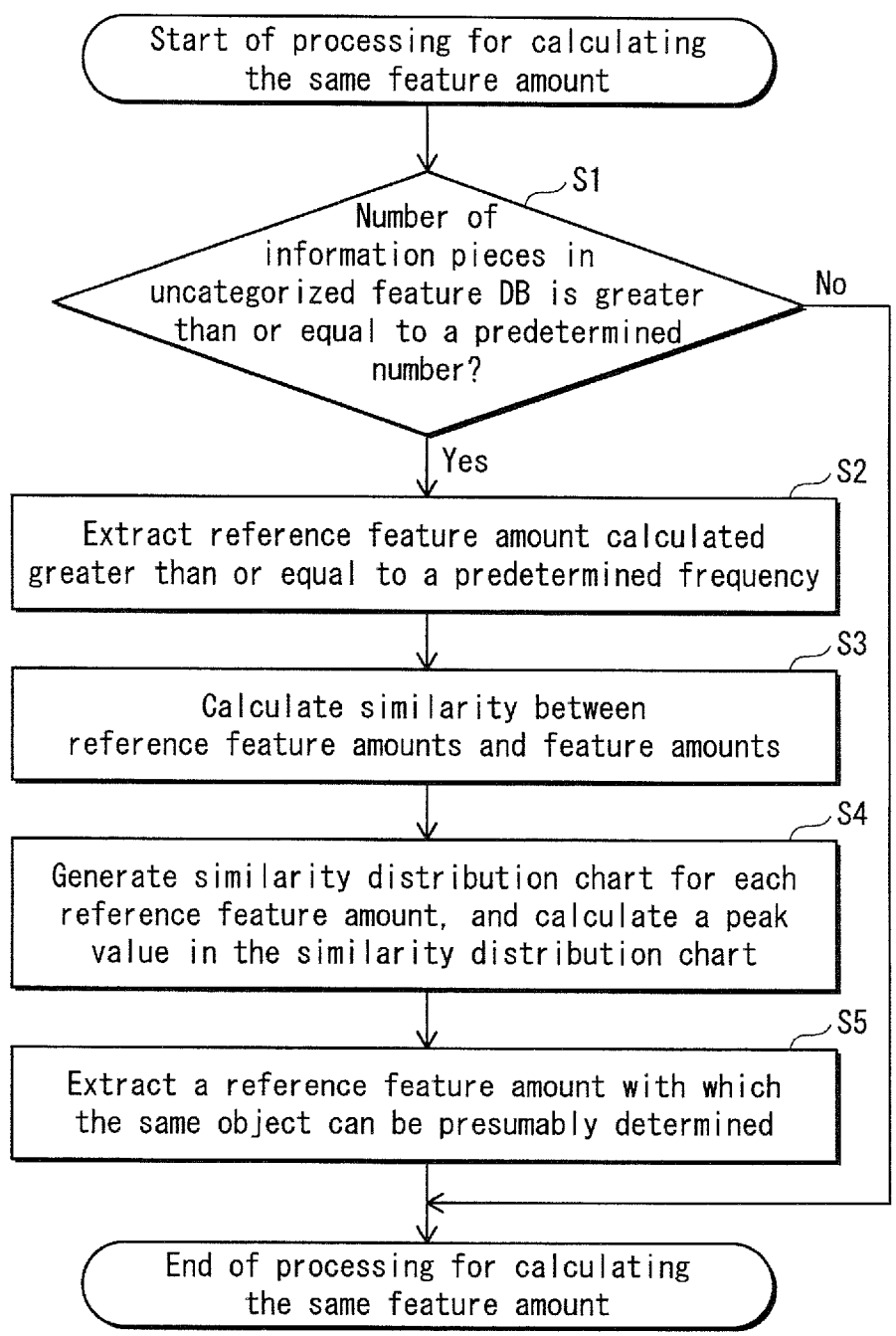
FIG. 7 is a flowchart showing processing for calculating the same feature amount.

In order to create a local model, the data processing device 100 needs to extract a feature amount with which subject information is detectable. The subject information pertains to a subject that often appears in the local AV data of a user. FIG. 7 is a flowchart showing the processing of the data processing device 100 extracting the same feature from local AV data.

The data processing device 100 starts the processing for extracting the same feature when, for example, the categorization unit 4 has started processing for categorization.

When the processing for categorization has been started, the same feature extraction unit 8 judges whether the number of non-categorization information pieces accumulated in the uncategorized feature DB 7 is greater than or equal to a predetermined number necessary for starting the processing for extracting the same feature (step S1). Suppose that the categorization target is still images. In this case, the same feature extraction unit 8 judges whether the still images satisfy any of the criteria 1, 2, 3 and so on in the first reference parameter table T100 shown in FIG. 5.

When judging that the number of non-categorization information pieces is not greater than or equal to the predetermined number necessary for starting the processing ("No" in step S1"), the same feature extraction unit 8 ends the processing for extracting the same feature.

When judging that the number of non-categorization information pieces is greater than or equal to the predetermined number necessary for starting the processing ("Yes" in step S1"), the same feature extraction unit 8 extracts, from all feature amounts extracted from each AV data piece, at least one reference feature amount whose calculation frequency is greater than or equal to a predetermined frequency, based on the value of F(x) in the formula 1 (step S2).

The same feature extraction unit 8 calculates, for each reference feature amount that has been extracted, the similarity between the reference feature amount and each of the reference feature amounts calculated from all AV data pieces (step S3). Specifically, in a case where the reference feature amounts are Visual Words, the same feature extraction unit 8 calculates, as similarity (i.e., SIFT feature amount), the distance from the reference feature amounts to the models of the Visual Words. As shown in FIG. 3, the same feature extraction unit 8 calculates, for each reference feature amount, a detection count that is the number of detected SIFT feature amounts.

The same feature extraction unit 8 creates, for each reference feature amount extracted as having a large detection count, a similarity distribution chart (see FIG. 4) that shows the detection count of the reference feature amount in each of the AV data pieces that have not been categorized, and calculates a peak value in each of the similarity distribution charts (step S4).

The same feature extraction unit 8 determines, with use of the calculated peak values, a reference feature amount having a peak value based on which the same object can be presumably determined, and extracts the reference feature amount (step S5). Then, the same feature extraction unit 8 outputs the reference feature amount as the same feature to the local model creation unit 9. Note that the determination using the peak values is performed based on whether any of the peak value criterion 1, the peak value criterion 2, . . . and so on is satisfied, as described above.

1.4 Summary

As described above, the data processing device 100 creates model data from a reference feature amount included in the AV data pieces (images) that have not been categorized, the reference feature amount having a peak value based on which the same object can be presumably determined.

Since model data specific to a user is accumulated in the local dictionary DB, it is possible to categorize images that cannot be categorized using the basic dictionary DB.

1.5 Modification

Figure 8:
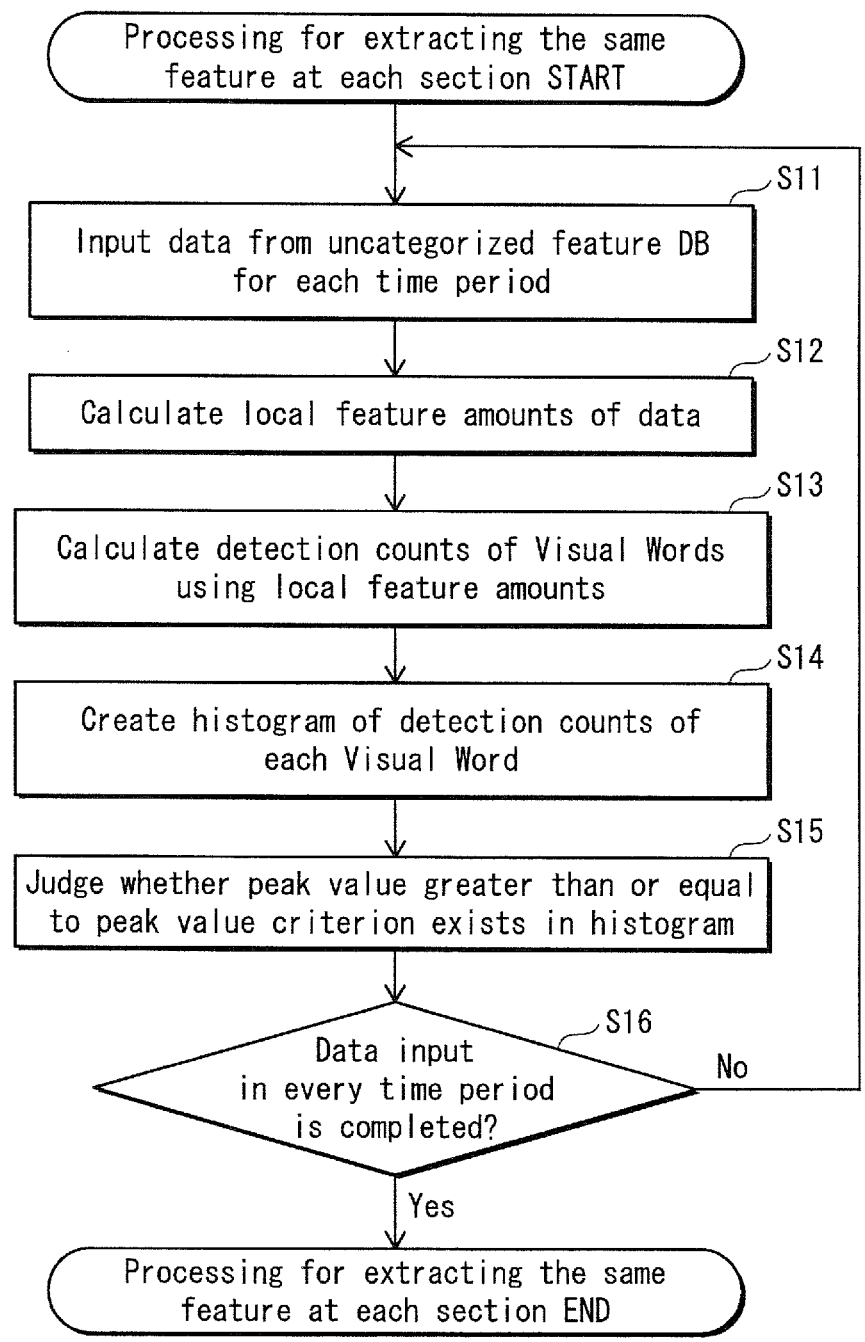
FIG. 8 is a flowchart showing processing for calculating the same feature amount in a unit of section.

In the above embodiment, the same feature is extracted from all of the AV data pieces that have not been categorized. However, it is not limited to such. Instead, the same feature may be extracted from each predetermined number of AV data pieces or from AV data pieces in each predetermined time period. The following describes the processing for extracting the same feature in this case, with reference to a flowchart shown in FIG. 8.

For convenience of description, a same feature extraction unit in the present modification is appended a reference sign "8a".

Although not shown in the figure, when the processing for categorization has been started, the same feature extraction unit 8a judges whether the number of non-categorization information pieces accumulated in the uncategorized feature DB 7 is greater than or equal to a predetermined number necessary for starting the processing for extracting the same feature, in the same manner as in Embodiment 1 above. When judging that the number of non-categorization information pieces is not greater than or equal to the predetermined number necessary for starting the processing, the same feature extraction unit 8a ends the processing for extracting the same feature.

When judging that the number of non-categorization information pieces is greater than or equal to the predetermined number necessary for starting the processing, the same feature extraction unit 8a inputs feature amounts detected from the uncategorized feature DB for each predetermined time period (step S11).

The same feature extraction unit 8a calculates a BoF that is a local feature amount, in a unit of input for each predetermined time period (step S12). Then, the same feature extraction unit 8a calculates the detection counts of respective Visual Words, with use of the local feature amounts calculated in step S12 (step S13).

The same feature extraction unit 8a creates, for each Visual Word, a histogram as shown in FIG. 3 which shows the detection counts of the Visual Word, with use of the calculated detection counts (step S14).

The same feature extraction unit 8a judges whether a peak value exists in the histograms that each show the detection counts of the corresponding Visual Word, determines a reference feature amount having a peak value greater than or equal to a peak value criterion, and extracts the reference feature amount as the same feature in the predetermined interval (step S15).

The same feature extraction unit 8a judges whether the above processing has been completed with respect to all feature amounts in every predetermined time period (step S16). When judging that the processing has been completed ("Yes" in step S16), the same feature extraction unit 8a ends the processing. When judging that the processing has not been completed ("No" in step S16), the same feature extraction unit 8a returns to step S11, and repeats the processing until the processing is completed in every predetermined time period.

Note that in the above flowchart, a target for extraction is a group of images obtained in each predetermined time period. However, it is not limited to such. For example, it is possible to extract images in a unit of a predetermined number, a predetermined area, an event, etc., as long as images are divided into groups by the unit.

Figure 9:
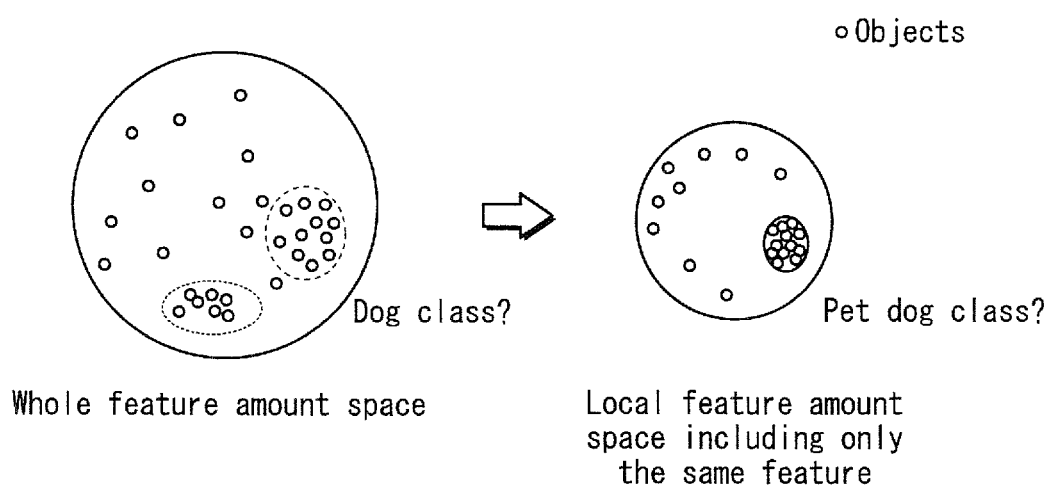
FIG. 9 shows an image example of creating a local model by extracting a feature amount from a local feature amount space including the same feature.

As a result, the data processing device according to the present modification can extract a feature amount from a local feature amount space including only the same feature, and create, in the local feature amount space, models (e.g., a pet dog of a family, special belongings, etc.) that are difficult to be created in a whole feature amount space, as shown in FIG. 9. Local models created in the aforementioned manner are specific to local AV data pieces, thus enabling accurately categorizing the local AV data pieces with use of the local models.

As described above, instead of creating local models in a distance space using all feature amounts, feature amounts to be used are first limited to feature amounts that are likely to identify the same object, and thereafter local models are created in the limited space. In this way, models having a high capability in identifying local AV data pieces are created instead of general models. This makes it possible to define the category of an object specific to a group of local AV data pieces, and accurately extract model information of the object.

Note that the non-categorization information in the uncategorized feature DB may be used as follows. For example, the same feature may be calculated with use of all the non-categorization information pieces as described in Embodiment 1. Alternatively, the same feature may be calculated with use of non-categorization information pieces in a unit of a predetermined number, an event, time, an area, etc., as seen in the present Modification.

A method for extracting the same feature from images may be any method as long as it uses a feature amount with which the same object existing in the database can be extracted. For example, it is possible to employ a method of comparing a feature point with a corresponding feature point to judge whether these two feature points include the same object. If it is judged that these feature points include the same object, these feature points are extracted. Also, it is possible to employ a method of using a color histogram or overall similarity in edge amount distribution.

2. Embodiment 2

The following describes Embodiment 2 according to the present invention, with reference to the drawings.

Embodiment 2 relates to a method for creating a local model optimal in time sequence, instead of a local model optimal in all data pieces, by taking into consideration not only the number of information pieces and the similarity between the information pieces, but also time continuity as information specific to local AV data.

Note that in the present embodiment, components having the same functions as in Embodiment 1 are given the same reference signs, and descriptions thereof are omitted.

Also, unless otherwise described, the structure of each component having the same reference sign, as well as the basic structure of the data processing device, is the same as in Embodiment 1.

The present embodiment provides a method for creating a local model more suitable for a local DB of a user. Specifically, the present embodiment provides a method for creating a model specific to a local DB in consideration of the transition of accumulated AV data pieces in time sequence, instead of a method for creating a model specific to a local DB with use of all AV data pieces. The following describes in detail a method for creating a local model based on a result of analysis of image information, on the assumption that data used in the present embodiment is mainly images.

2.1 Structure

The following describes a structure of a data processing device according to Embodiment 2, particularly the parts that are different from the structure of Embodiment 1.

Embodiment 2 is different from Embodiment 1 with respect to a functional structure of a local model creation unit. Since other components are the same as those in Embodiment 1, the following describes the local model creation unit.

(1) Local Model Creation Unit 20

Figure 10:
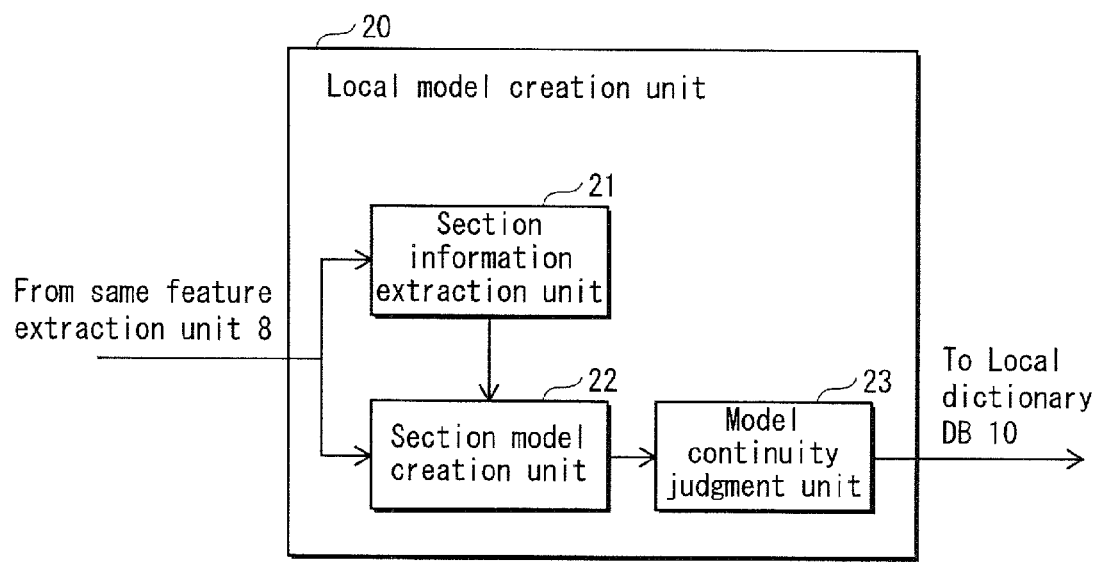
FIG. 10 is a block diagram showing a local model creation unit 20.

The following describes an example of the functional structure of a local model creation unit 20 according to the present embodiment, with reference to FIG. 10. FIG. 10 is a functional block diagram of the local model creation unit 20. The local model creation unit 20 includes a section information extraction unit 21, a section model creation unit 22, and a model continuity judgment unit 23.

(1-1) Section Information Extraction Unit 21

The section information extraction unit 21 extracts, as group information of local AV data pieces, section information in a predetermined unit of data, time, place, or event. For example, the section information extraction unit 21 may use image-capturing time indicated by EXIF (Exchangeable Image File Format) information, and GPS (Global Positioning System) information, thereby automatically calculating section information indicating a section in which images were continuously captured. Also, the section information extraction unit 21 may divide the local AV data pieces into groups with use of, for example, folder information pieces created by a user, and extract section information of each group.

Here, it is assumed that the section information extraction unit 21 calculates section information indicating a section in which images were continuously captured, based on image-capturing time included in the EXIF information. Specifically, the section information extraction unit 21 analyzes the non-categorization information stored in the uncategorized feature DB 7, and extracts, from the EXIF information, time information of each of the images that are stored in the local DB 1 and that are targeted for processing. Then, according to the time information that has been extracted, the section information extraction unit 21 calculates the number of images captured for each time period of, for example, an hour, starting from the date and time at which an image was initially captured. Subsequently, the section information extraction unit 21 cumulatively calculates the number of images calculated for each hour, starting from the number of images calculated for the first one hour. When there exists a section in which the total number of images is greater than or equal to 500 and no image has been added for three consecutive hours or longer, the section information extraction unit 21 extracts the section and sets the total number of images to zero.

The section information extraction unit 21 performs the aforementioned operation on all the images targeted for processing.

(1-2) Section Model Creation Unit 22

The section model creation unit 22 creates a local model for each section extracted by the section information extraction unit 21, with use of a group of feature amounts calculated by the same feature extraction unit 8. Here, the section model creation unit 22 may create the local models with use of the same method as in Embodiment 1.

Note that similarity may be calculated, for example, by calculating a distance between the local models based on a multivariate feature amount, in the same manner as in Embodiment 1.

(1-3) Model Continuity Judgment Unit 23

The model continuity judgment unit 23 judges, for each local model created in the respective sections, whether the local model has time continuity in the local DB 1, by calculating the number of consecutive sections in each of which the local model has been created. The model continuity judgment unit 23 sequentially tags the local models, starting from the one having the highest time continuity (i.e., the one having the highest frequency of appearance).

Also, the model continuity judgment unit 23 calculates whether a feature amount of each local model is partially changed as a secular change, thereby judging whether some of the local models have a certain change tendency. When judging that some of the local models have a certain change tendency, the model continuity judgment unit 23 associates the local models with each other (i.e., provides the local models with the same tag) and indicates that the local models have the same feature.

2.2 Operation

Figure 11:
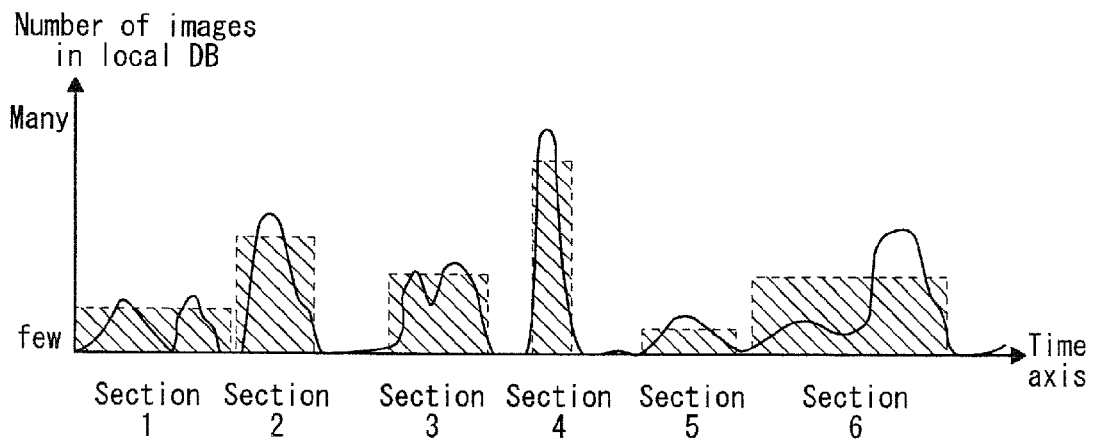
FIG. 11 shows an example of images existing in each section.

The following describes in detail a method for creating a local model in a case where AV data pieces are images. FIG. 11 shows an example of images existing in each section. In the present embodiment, the local DB 1 is assumed to have stored therein images captured by a user in time sequence, as shown in FIG. 11. In FIG. 11, the horizontal axis represents a time axis and the vertical axis represents the number of images per hour.

Figure 12:
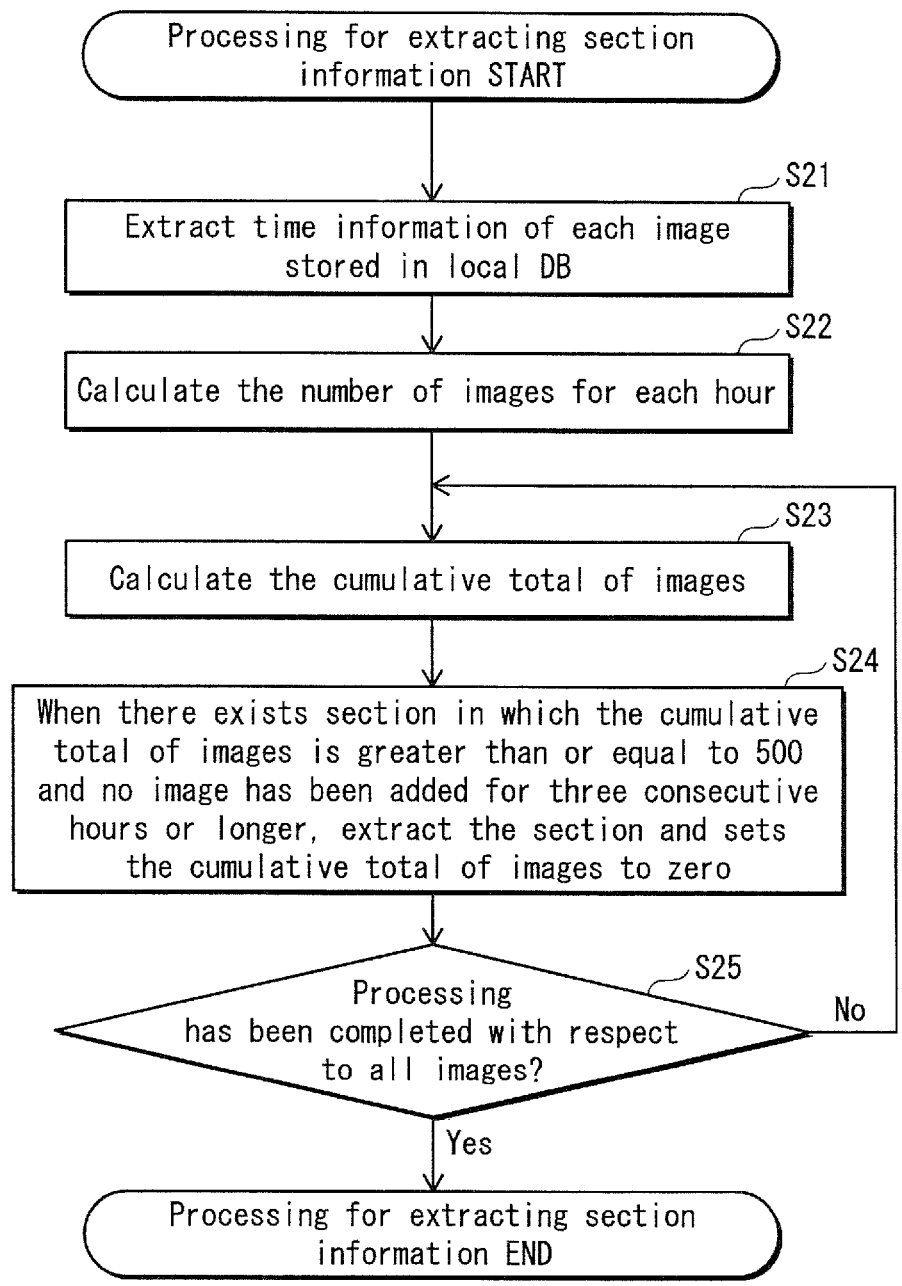
FIG. 12 is a flowchart showing processing for extracting section information.

The following describes an operation of the section information extraction unit 21 in this case, with reference to a flowchart shown in FIG. 12.

First, the section information extraction unit 21 analyzes the non-categorization information stored in the uncategorized feature DB 7, and extracts, from the EXIF information, time information of each of the images that are stored in the local DB 1 and that are targeted for processing (step S21).

According to the time information that has been extracted, the section information extraction unit 21 calculates the number of images captured for each time period of, for example, an hour, starting from the date and time at which an image was initially captured (step S22).

The section information extraction unit 21 cumulatively calculates the number of images calculated for each hour, starting from the number of images calculated for the first one hour (step S23).

When there exists a section in which the total number of images is greater than or equal to 500 and no image has been added for three consecutive hours or longer, the section information extraction unit 21 extracts the section and sets the total number of images to zero (step S24).

The section information extraction unit 21 judges whether the above processing has been completed with respect to all the images targeted for processing (step S25). When judging that the processing has been completed ("Yes" in step S25), the section information extraction unit 21 ends the processing for extracting section information. When judging that the processing has not been completed ("No" in step S25), the section information extraction unit 21 returns to step S23, and repeats the processing until the processing is completed with respect to all the images.

2.3 Specific Example

By performing the above processing, the section information extraction unit 21 can extract, for example, sections 1 to 6 as shown in FIG. 11.

Figure 13:
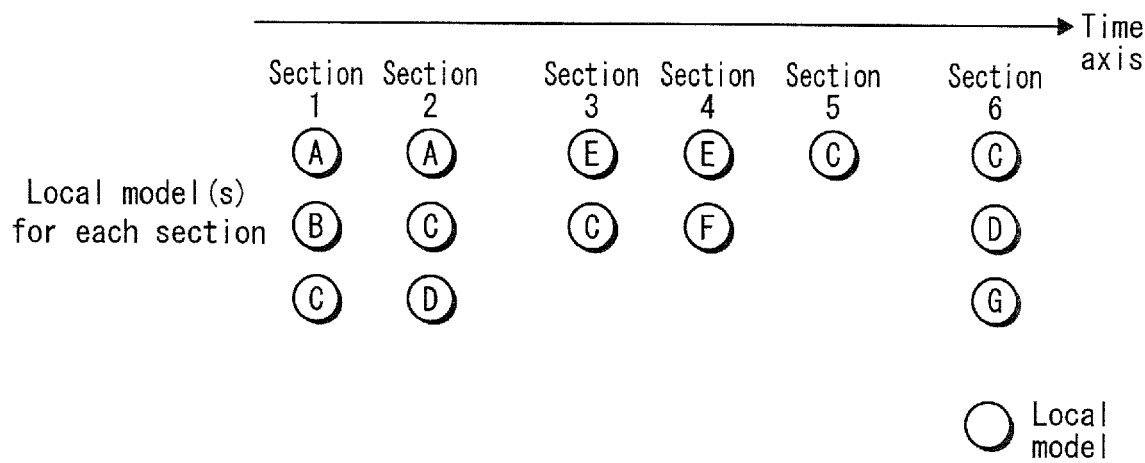
FIG. 13 shows an example of local models created in units of sections and the time continuity of each local model.

The section model creation unit 22 creates a local model for each of the sections (i.e., the sections 1 to 6) extracted by the section information extraction unit 21. As shown by the example shown in FIG. 11, six sections (i.e., the sections 1 to 6) are extracted. Therefore, as shown in FIG. 13, local models A, B, C, D, E, F, and G are created in the six sections.

The model continuity judgment unit 23 judges whether each of the local models that have been created has time continuity, periodicity, or a secular change. In the example of FIG. 13, the model continuity judgment unit 23 calculates the overall similarity among the local models in the sections 1 to 6, and provides the same label for the local models that are similar to a predetermined degree. As a result, the local model C is extracted that has high time continuity, i.e., a high frequency of appearance. Accordingly, the model continuity judgment unit 23 preferentially tags the local model C as a local model having a higher local attribute than a local model existing for a short period of time (e.g., local models B and G).

Figure 14:
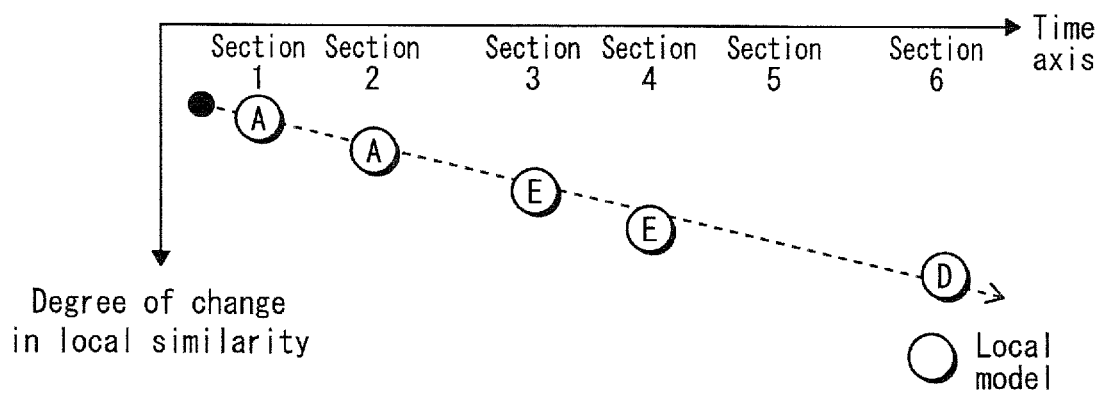
FIG. 14 shows an example of local models created in units of sections and a secular change of each local model.

Also, the model continuity judgment unit 23 detects a secular change in the local models. For example, when the local models A, E, and D has a proportional relationship with respect to degrees of change in a local similarity as shown in FIG. 14, the model continuity judgment unit 23 extracts the local models A, E, and D as local models having a certain secular change, preferentially tags the local models A, E, and D as models having a high local attribute, and associates these models A, E, and D as the same object. Specifically, the model continuity judgment unit 23 extracts local models having any of the following changes: a secular change which is a change in the face or body of a child as the child grows up; a change in an object due to deterioration or damage; a change in the shape of an object, such as a car, so as to follow a trend; and so on. In this way, the model continuity judgment unit 23 calculates a degree of change in the similarity of a local feature amount, for each group of the local models extracted as having a high similarity. Then, the model continuity judgment unit 23 performs, for example, statistical processing such as principal component analysis. If there is a correlation between groups of local models with respect to the degrees of change in the similarity of a local feature, the model continuity judgment unit 23 extracts the local models having the correlation, as one model having a secular change, although the local models are different from each other in view of the overall feature. In other words, suppose that (i) the similarity between a first feature amount of a first model and a first feature amount of a second model is greater than or equal to a predetermined degree, and (ii) the similarity between a second feature of the first model and a second feature of the second model is less than the predetermined degree but the degree of change in the second features of the first and the second model has a certain tendency. In this case, the models can be extracted as one model having a secular change.

2.4 Summary

As described above, according to the present embodiment, the data processing device judges whether the local models that have been created have continuity in the local DB 1. This enables creating: a local model that is effective on a one time basis or for a short period of time; a local model that is effective cyclically or for a long period of time; or a local model that adaptively changes according to a secular change.

Also, according to the present embodiment, the data processing device does not create a local model optimal to all the feature amounts with use of all AV data pieces. Instead, the data processing device extracts a group of AV data pieces that are related to each other with respect to, for example, time continuity, thereby limiting all the AV data pieces to a group of AV data pieces for each section. Then, the data processing device creates a local model for each section, judges continuity between the models in the sections, and creates a local model having a higher local attribute. With this structure, the data processing device can create a local model having a high capability in identifying a local AV data piece, in consideration of the tendency of the AV data pieces owned by a user. This makes it possible to define the category of an object specific to the local AV data pieces, and accurately extract model information of the object.

2.5 Modification

In the present embodiment, the section information extraction unit 21 extracts, from the EXIF information, the time information of each of the images targeted for processing. However, the time information may be extracted from data generation time information indicating the time at which each of the images was generated.

The structure of the present embodiment includes the same feature extraction unit 8. However, it is not limited to such. It is possible to employ a structure of using a general feature amount calculated by the feature amount extraction unit 3, or a structure of using feature amounts extracted from all the AV data pieces.

Also, in the present embodiment, detailed descriptions are provided only for the time continuity of still image data. However, it is possible to use audio data or moving image data, instead of still image data. Also, instead of time continuity, it is possible to use continuity pertaining to a place, or continuity pertaining to an event which is judged based on combined information indicating time, place, and the like.

3. Embodiment 3

The following describes Embodiment 3 according to the present invention, with reference to the drawings.

The present embodiment relates to a method for correcting errors in the same features that are automatically extracted and the local models that are automatically created, for extracting the same features that are not automatically extracted, and for creating local models that are not automatically created, by taking into consideration of feedback from a user (hereinafter "user interaction") at the time of extracting the same features, creating local models, or displaying a result of categorization based on the created local models.

Note that in the present embodiment, components having the same functions as in Embodiment 1 are given the same reference signs, and descriptions thereof are omitted to avoid redundancy.

Also, unless otherwise described, the structure of each component having the same reference sign, as well as the basic structure of the data processing device, is the same as in Embodiment 1.

In the present embodiment, a method is employed for accurately extracting the same feature suitable for the local DB 1 of a user, and creating a local model suitable for the local DB 1. This method is different from the method for automatically performing all processing procedures by means of a predetermined program. According to the method in the present embodiment, a feature specific to the local DB 1 is accurately extracted and a local model specific to the local DB 1 is accurately created, in consideration of input information of the user by user interaction at the time of input and output steps in the processing procedures.

The following describes in detail a method for extracting the same feature and creating a local model based on the user interaction at the time of input and output steps in image analysis, on the assumption that data used in the present embodiment is mainly images.

3.1 Structure

The following describes a structure of a data processing device according to Embodiment 3, particularly the parts that are different from the structure of Embodiment 1.

Figure 15:
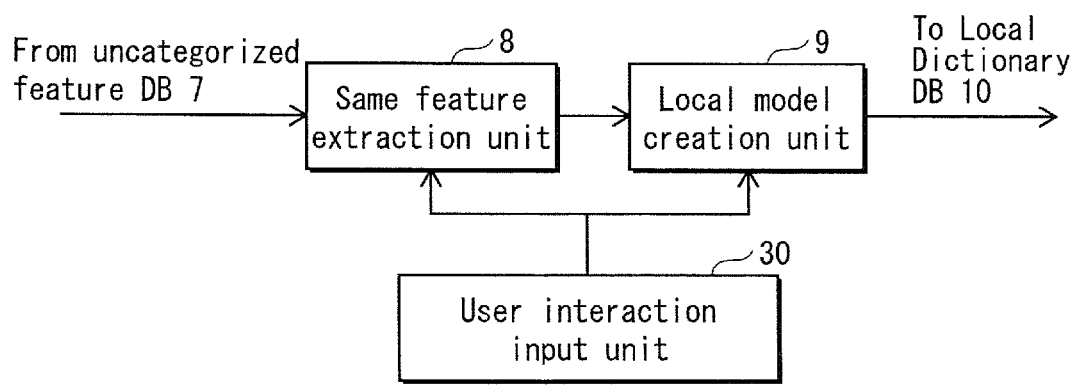
FIG. 15 is a block diagram showing a structure including a user interaction input unit 30.

FIG. 15 is a block diagram showing a structure in the present embodiment. In this structure, a user interaction input unit 30 having a function of inputting user interaction is newly added to the structure shown in FIG. 1.

The following describes a function of the user interaction input unit 30, and additional functions of the same feature extraction unit 8 and the local model creation unit 9.

(1) User Interaction Input Unit 30

The user interaction input unit 30 is provided to improve the accuracy of processing results by the same feature extraction unit 8 and the local model creation unit 9, and has a function of inputting additional information for the AV data of a user or a result of calculation by the data processing device.

Figure 16:
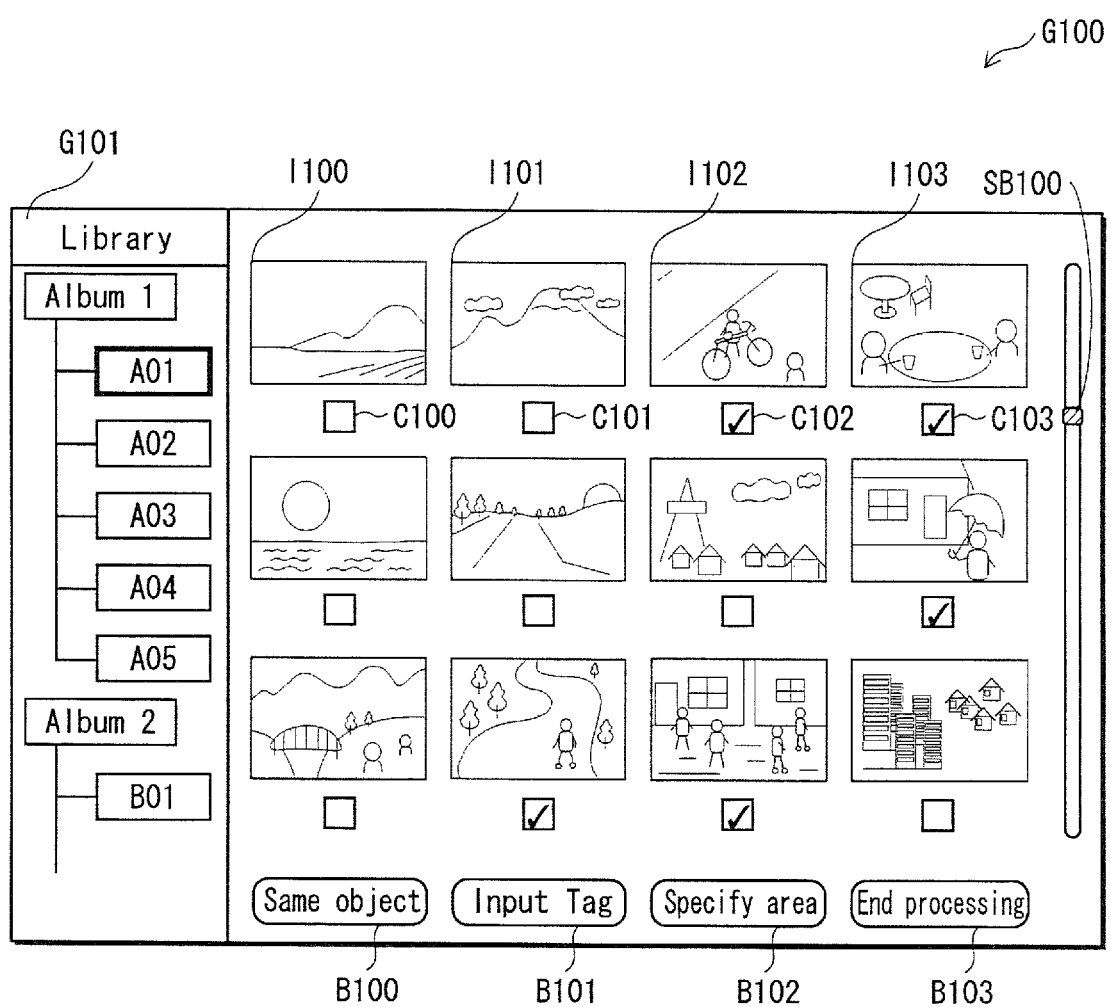
FIG. 16 shows an example of an image G100 displayed by the user interaction input unit 30.
Figure 17:
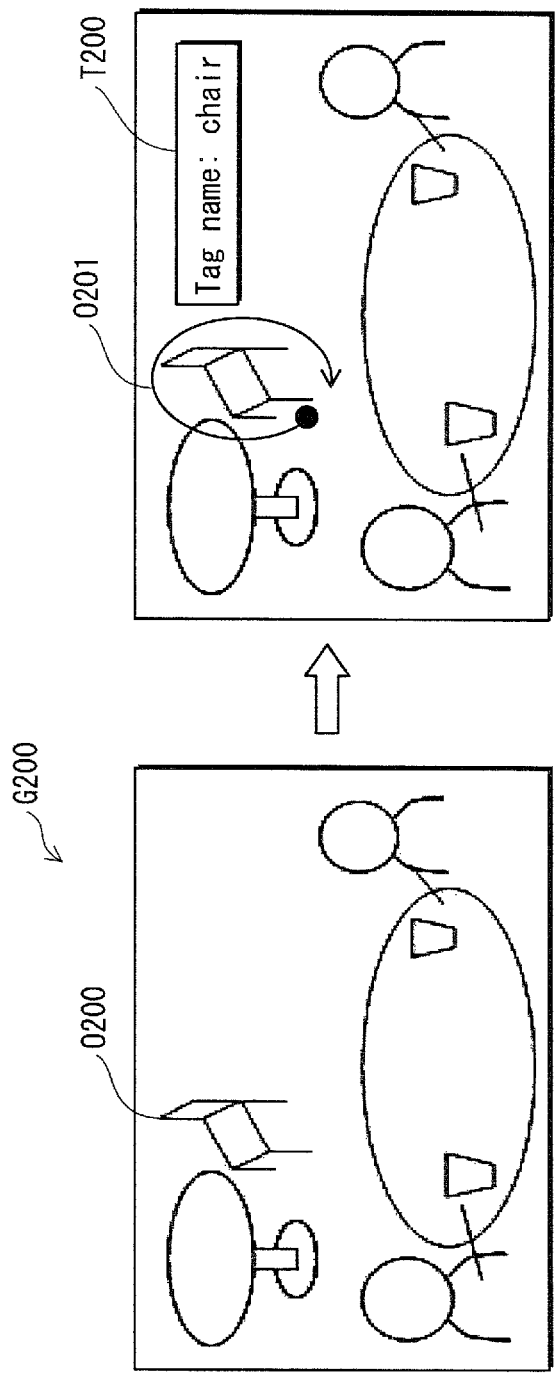
FIG. 17 shows an example of an image G200 displayed by the user interaction input unit 30.
Figure 18:
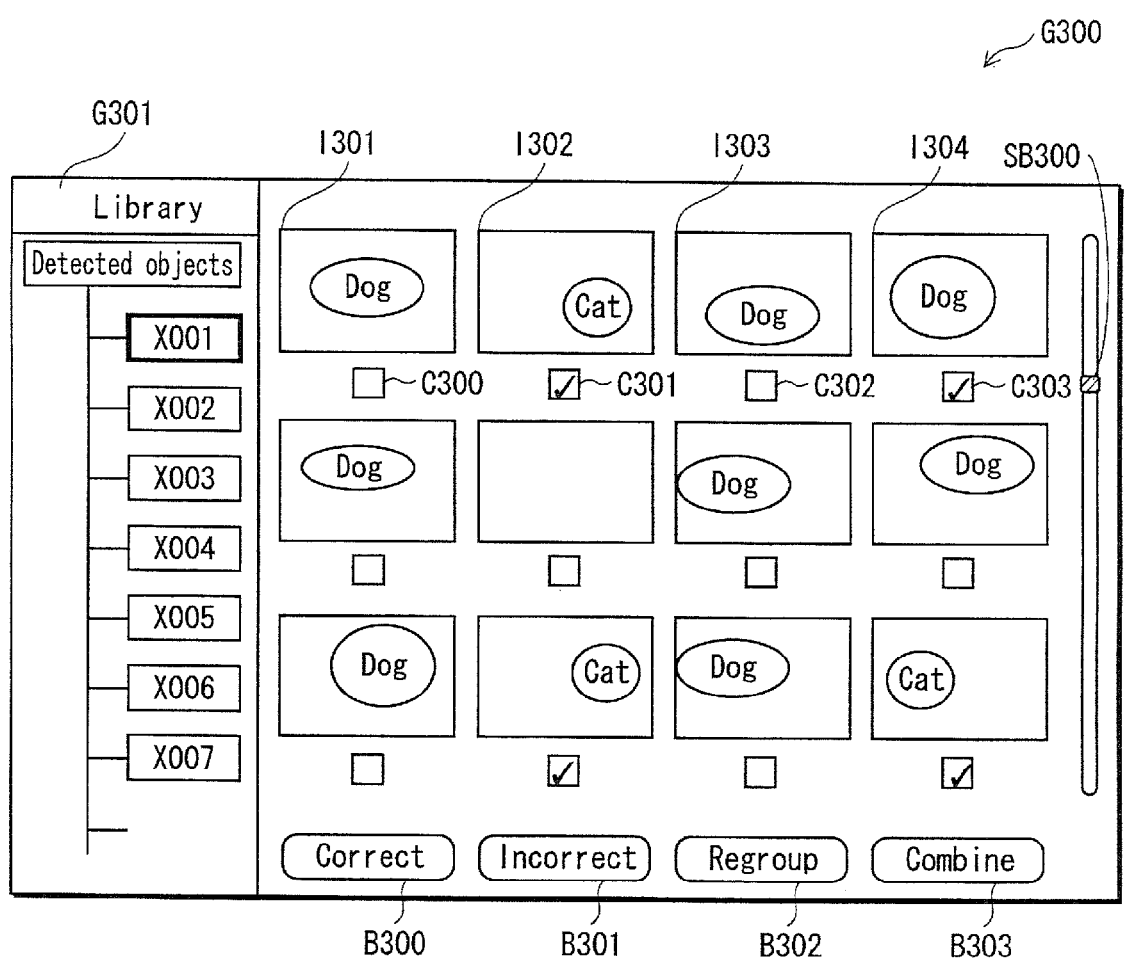
FIG. 18 shows an example of an image G300 displayed by the user interaction input unit 30.

Specifically, the user interaction input unit 30 displays: an image G100 shown in FIG. 16; an image G200 shown in FIG. 17; and an image G300 shown in FIG. 18, and receives an instruction from a user. In the present embodiment, it is assumed that a screen for displaying images includes a touch panel function.

(Image G100)

The image G100 in FIG. 16 shows an example of inputting, to images, information indicating the same object, tag information, and the like.

The image G100 in FIG. 16 includes: a library G101 showing locations at which displayed images are stored; uncategorized images I100, I101, I102, I103 and so on; buttons B100, B101, B102, and B103; and a scroll bar SB100.

In the library G101, a library currently being displayed is surrounded by a bold frame so as to indicate to the user the location at which the displayed images are stored. In the present embodiment, a library A01, which is located under an album 1, is surrounded by the bold frame. Therefore, the user can instantly recognize that the images currently being displayed are stored in the library A01.

The displayed images I100, I101, I102, I103, etc. are included in the library A01 that is currently being displayed, and have not been categorized. Checkboxes C100, C101, C102, C103, etc. are displayed under the displayed images I100, I101, I102, I103, etc., respectively. The user can specify one or more images targeted for processing from among the displayed images, by checking the checkboxes corresponding to the images. In the example shown in FIG. 16, the images I102, I103, and three other images (five images in total) are specified.

The button B100 is for indicating that a plurality of images specified for processing include the same object. When the button B100 is pressed, the same feature extraction unit 8 extracts a feature amount pertaining to the same object from the plurality of images specified for processing. Since the rest of the operations of the same feature extraction unit 8 and the local model creation unit 9 are the same as those in Embodiment 1, descriptions thereof are omitted here.

The button B101 is for associating each image specified for processing with the tag information. When the button B101 is pressed by a user operation, an image displayed on the screen is transitioned from the image G100 to the image G200.

The button B102 is for specifying, for each image specified for processing, an area in which a feature amount is to be extracted. After pressing the button B102, the user specifies, with use of a mouse, an area in which a feature amount is to be extracted.

The button B103 is for ending the processing pertaining to user interaction.

The scroll bar SB100 is for scrolling the displayed images. The user drags the scroll bar SB100 with use of the mouse, thereby scrolling the images.

(Image G200)

The image G200 shown in FIG. 17 is displayed when the button B101 in the image G100 is pressed. This example shows a display state where the image I103 in FIG. 16 is specified and the button B101 is pressed.

The user interaction input unit 30 displays the specified image, and thereafter receives, from the user, the specification of an object with which the tag information is to be associated.

Specifically, the user specifies an area by encircling, with his/her finger, an object with which the tag information is to be associated. For example, in the case of associating an object O200 with the tag information, the user specifies an area O201 by encircling the object O200 with his/her finger.

Upon receiving the specification of the area O201, the user interaction input unit 30 displays a box T200 in which a tag name is to be input.

The user inputs the tag information (in this example, "chair" as a tag name) in the box T200.

The user interaction input unit 30 acquires the non-categorization information of the image with which the tag information is associated, and notifies the local model creation unit 9 of the non-categorization information and the tag information.

Subsequently, the local model creation unit 9 associates the tag information (i.e., "chair") that has been input, with a local model created for the object O200 that have been specified.

(Image G300)

The image G300 in FIG. 18 shows an example of inputting an instruction based on a result of categorization by the data processing device.

The image G300 in FIG. 18 includes: a library G301; images I301, I302, I303, I304 and so on; buttons B300, B301, B302, and B303; and a scroll bar SB300.

The library G301 shows a library name for each of the objects detected by the same feature extraction unit 8 and the local model creation unit 9. In the library G301, the name of a library (i.e., folder) currently being displayed is surrounded by a bold frame so as to indicate to the user the library. In the present embodiment, the library name "X001" is surrounded by a bold frame.

The displayed images I301, I302, I303, I304, etc. are included in the library X001 that is currently being displayed. Check boxes C300, C301, C302, C303, etc. are displayed under the displayed images I301, I302, I303, I1304, etc., respectively. The user can specify one or more images targeted for processing from among the displayed images, by checking the checkboxes corresponding to the images. In the example shown in FIG. 18, the image I302, and three other images (four images in total) are specified.

The button B300 is for recreating a local model with use of the plurality of images specified for processing. When the button B300 is pressed, the same feature extraction unit 8 extracts a feature amount pertaining to the same object from the plurality of images specified for processing. Since the rest of the operations of the same feature extraction unit 8 and the local model creation unit 9 are the same as those in Embodiment 1, descriptions thereof are omitted here.

The button B301 is for recreating a local model with use of images excluding one or more images that are specified. When the button B301 is pressed, the same feature extraction unit 8 extracts a feature amount pertaining to the same object from the images excluding the one or more images that are specified. Since the rest of the operations of the same feature extraction unit 8 and the local model creation unit 9 are the same as those in Embodiment 1, descriptions thereof are omitted here. For example, the image G300 of FIG. 18 mainly includes images each showing a dog, but also includes irrelevant images showing cats and an image showing a scene. Therefore, the user may specify the irrelevant images by checking the checkboxes corresponding to the irrelevant images, and press the button B301. In this way, a local model is recreated based on only the images showing the dogs.

The button B302 is for dividing images into two groups, i.e., a group of images specified for processing and a group of the remaining images, and creating a local model for each group. When the button B302 is pressed, a local model is created for each group of images divided by the same feature extraction unit 8 and the local model creation unit 9.

The button B303 is for combining two or more libraries. When the button B303 is pressed, a local model is created with use of two or more libraries, by the same feature extraction unit 8 and the local model creation unit 9.

The scroll bar SB300 has the same function as the scroll bar SB100. Therefore, descriptions thereof are omitted here.

When the button B300 or the button B301 is pressed, and the displayed images are recategorized, the user interaction input unit 30 shows a result of the recategorization.

When the button B302 is pressed, and the displayed images are divided into groups, the user interaction input unit 30 shows a result of the division.

When the button B303 is pressed, and two or more specified groups of images are combined, the user interaction input unit 30 shows a result of the combination.

The user interaction input unit 30 has the following advantage. Suppose that as shown in FIG. 18, various objects are shown as a result of categorization by the data processing device. In this case, the user can specify all images showing objects other than the dominant objects in the result of categorization, and press the button B301, thereby correcting the result of categorization. Specifically, the library X001 in FIG. 18 mainly stores images each showing a dog, but also includes irrelevant images showing cats and an image showing a scene. In this case, the user can specify the irrelevant images by checking the checkboxes corresponding to the irrelevant images, and feed back to the data processing device. By doing so, the user can correct a result of categorization and specify only the images showing the dogs. It is also possible to correct a result of categorization by: specifying only the images that are correctly categorized; further dividing the images of dogs into types of dogs; combining groups of images together if the images are too specifically categorized; and so on.

3.2 Operation

Figure 19:
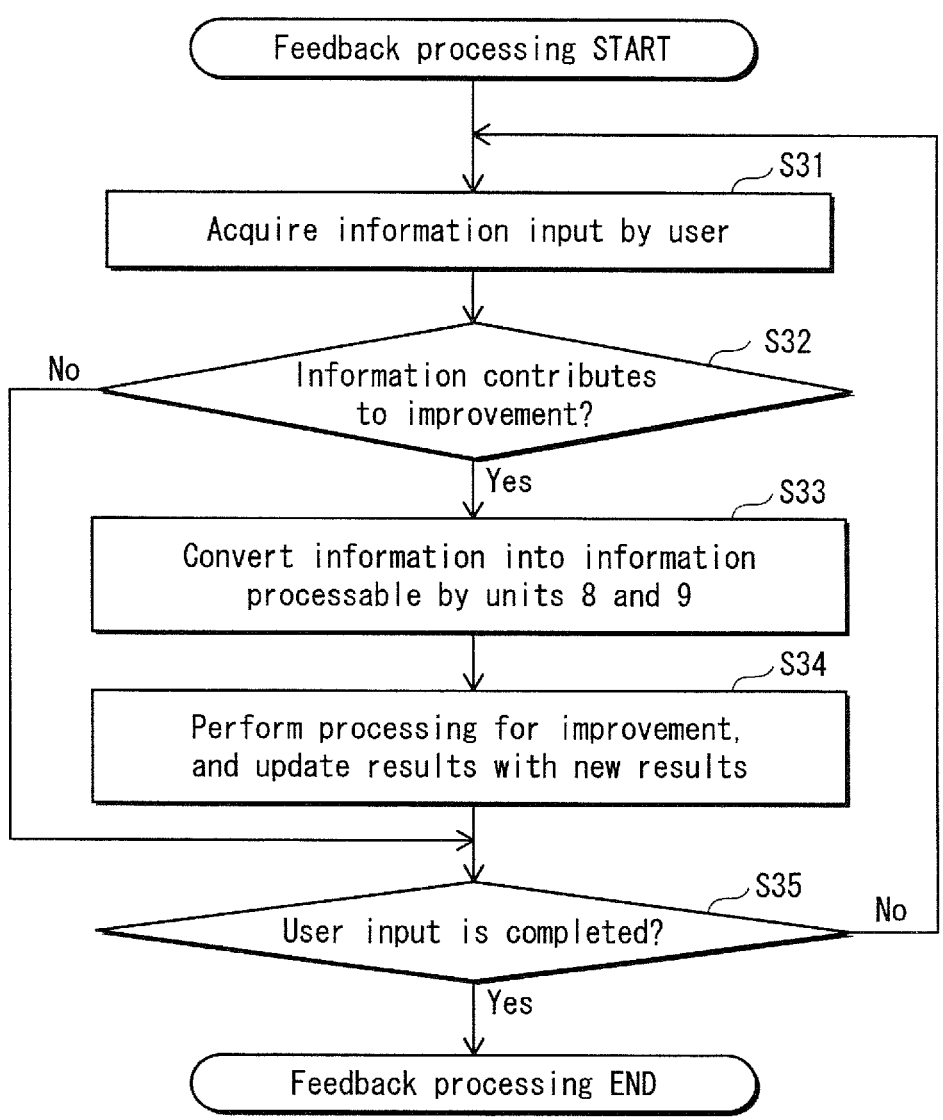
FIG. 19 is a flowchart showing feedback processing.

The following describes in detail a method for receiving an instruction by user interaction, thus improving the processing for extracting the same feature and the processing for creating a local model. FIG. 19 is a flowchart showing a specific procedure of the feedback processing.

When information has been input by the user, the user interaction input unit 30 starts the feedback processing. First, when information related to AV data has been input by a user, the user interaction input unit 30 acquires the information (step S31). Specifically, when the user has specified images targeted for processing from the image G100 in FIG. 16 or the image G300 in FIG. 18, and has pressed any of the buttons, the user interaction input unit 30 acquires input information indicating (i) the number of specified images and (ii) the content of processing corresponding to the pressed button.

Then, the user interaction input unit 30 judges whether the input information contributes to the improvement of image processing (step S32). Note that the input information that contributes to the improvement of image processing is, in a case where the AV data pieces are images, area-related information that relates to the area of an object included in each of the specified images, tag-related information that relates to tags, event-related information that relates to an event concerning the specified images, the number of the specified images, and so on. Specifically, the user interaction input unit 30 judges: whether the number of specified images is greater than or equal to two when the button B100 or the button B300 is pressed; whether the number of specified images is greater than or equal to one when the button B101 is pressed; and the number of unspecified images is greater than or equal to two when the button B301 is pressed. Also, when the button B302 is pressed, the user interaction input unit 30 judges whether each of the two groups into which images are divided includes at least two images, and when the button B303 is pressed, the user interaction unit 30 judges whether at least two libraries are specified.

When judging that the input information contributes to the improvement ("Yes" in step S32), the user interaction input unit 30 converts the input information into information processable by the same feature extraction unit 8 and the local model creation unit 9 (step S33). Specifically, the user interaction input unit 30 acquires non-categorization information (i.e., identifier for identifying an AV data piece) of each specified image. For example, when a name tag is attached to a household pet, the user interaction input unit 30 converts images and areas having the name tag into image information (non-categorization information) indicating the same object.

Based on the image information obtained by the conversion, the same feature extraction unit 8 and the local model creation unit 9 perform processing for improving the accuracy of results of image processing, and update the results with new results obtained after the processing for the improvement (step S34). After the results are updated to new results, the user interaction input unit 30 judges whether the user has completed inputting information relating to user interaction (step S35). When judging that the user has completed inputting the information ("Yes" in step S34), the user interaction input unit 30 ends the feedback processing. When judging that the user has not completed inputting the information ("No" in step S34), the user interaction input unit 30 returns to step S31, and repeats the processing until the user completes inputting the information.

When judging that the input information does not contribute to the improvement ("No" in step S32), the processing proceeds to step S35.

3.3 Summary

In Embodiment 1, the same feature extraction unit 8 automatically extracts the same feature with use of a clustering method. In this case, extraction is performed based on only the similarity between feature amounts, and whether the same feature that has been extracted belongs to the same object is irrelevant. As a result, an unnecessary feature amount is also extracted together with the same feature, causing the accuracy of the extraction of the same feature to be lowered. In the present embodiment, however, the user specifies the same object in advance. Therefore, upon receiving information indicating the same object, the data processing device can calculate similarity based on only image information indicating the same object, and thereby extract the same feature. This makes it possible to accurately extract the same feature.

Also, in the case of directly receiving the information indicating the same object, the local model creation unit 9 can create a local model directly from images corresponding to the information. This makes it possible to accurately create a categorization model. Even with indirect information such as information only indicating whether the same object is included, the local model creation unit 9 can correct an inaccurate categorization model that has been created by mistake.

As for the user interaction, the user may input information piece by piece or input information collectively regarding a certain function.

As described above, in the present embodiment, the data processing device does not automatically perform all processing procedures for extracting the same feature and creating a local model. Instead, the data processing device performs such processing procedures while correcting errors in the same feature and a local model, by taking into consideration of feedback from a user as user interaction. In this way, a local model is created as the accuracy in categorization is improved in stages. This makes it possible to correct and define in stages the category of an object specific to a group of local AV data pieces, thereby accurately extract the model information of the object.

4. Embodiment 4

The following describes Embodiment 4 according to the present invention, with reference to the drawings.

The present embodiment relates to a method for automatically creating a basic dictionary DB and a local dictionary DB, even when the basic dictionary DB 5 does not store in advance the definitions of categories used by the categorization unit 4 to classify local AV data. Specifically, according to the present embodiment, the basic dictionary DB and the local dictionary DB are automatically created in consideration of both (i) similar features for classifying, into categories, general objects included in local AV data pieces and (ii) the same feature for classifying an object specific to the local AV data.

Note that in the present embodiment, components having the same functions as in Embodiment 1 are given the same reference signs, and descriptions thereof are omitted to avoid redundancy.

The present embodiment provides a method for automatically creating a general model and a local model that are suitable for a local DB. Specifically, this method is different from a method for creating a model by accumulating the model information pieces of predefined categories. According to this method, a general model is also automatically created by extracting a similar feature as well as the same feature. The following describes in detail a method for creating a general model and a local model based on the two types of features (the same feature and a similar feature) in image analysis, on the assumption that data used in the present embodiment is mainly images.

4.1 Structure

Figure 20:
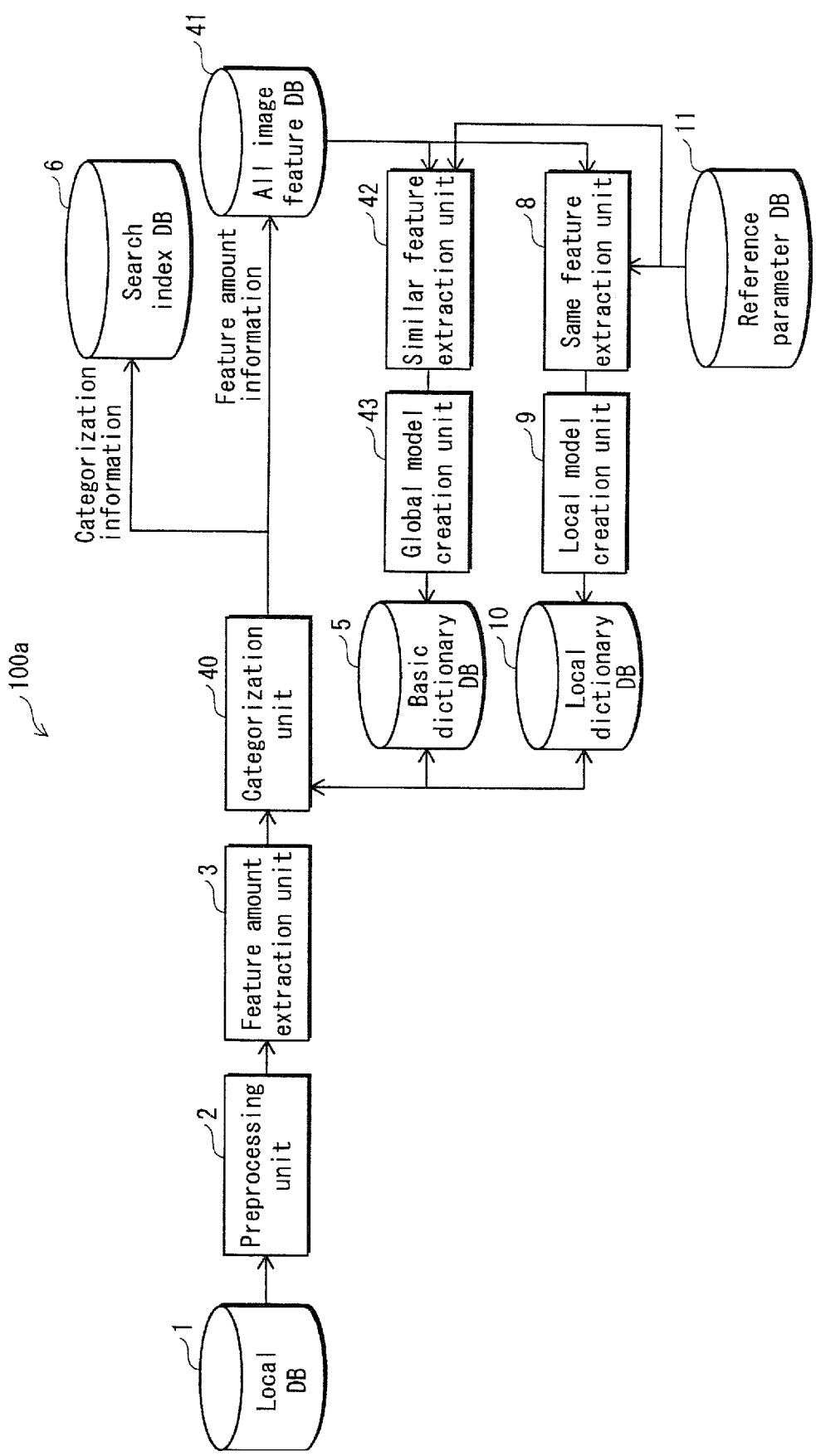

FIG. 20 is a block diagram showing a basic structure of a data processing device 100a according to the present embodiment. As shown in FIG. 20, the data processing device 100a includes the local DB 1, the preprocessing unit 2, the feature amount extraction unit 3, a categorization unit 40, the basic dictionary DB 5, the search index DB 6, the same feature extraction unit 8, the local model creation unit 9, the local dictionary DB 10, the reference parameter DB 11, an all image feature DB (data base) 41, a similar feature extraction unit 42, and a global model creation unit 43. Since the local DB 1, the preprocessing unit 2, the feature amount extraction unit 3, the basic dictionary DB 5, the search index DB 6, the same feature extraction unit 8, the local model creation unit 9, the local dictionary DB 10, and the reference parameter DB 11 are the same as those in Embodiment 1, descriptions thereof are omitted here.

(1) All Image Feature DB 41

The all image feature DB 41 stores all non-categorization information pieces calculated by the feature amount extraction unit 3.

(2) Similar Feature Extraction Unit 42

The similar feature extraction unit 42 extracts, from the feature amounts of all images, a feature amount common to various types of models (e.g., dogs), instead of a feature amount specific to a model (e.g., dog).

The similar feature extraction unit 42 judges whether the number of non-categorization information pieces accumulated in the all image feature DB 41 is greater than or equal to a predetermined number necessary for starting the processing for extracting a similar feature, with use of the first reference parameter table T100 stored in the reference parameter DB 11, in the same manner as the same feature extraction unit 8.

When judging affirmatively, the similar feature extraction unit 42 performs the processing for extracting a similar feature. When judging negatively, the similar feature extraction unit 42 does not perform the processing for extracting a similar feature.

Here, the following is possible as a method for extracting a similar feature: a criterion used for judging the similarity between feature amounts may be lowered compared to a criterion used in extracting the same feature; the same feature may be combined with similar features whose similarity is greater than or equal to a predetermined degree; a feature amount other than the same feature may be used; and a feature amount for use may be defined in advance.

(3) Global Model Creation Unit 43

The global model creation unit 43 defines the category of a general object among a group of local AV data pieces, with use of a similar feature extracted by the similar feature extraction unit 42, and calculates model information of the general object.

With the aforementioned structure, the data processing device 100a also creates a general categorization model based on the information pertaining to the local AV data pieces. This reduces the amount of information that cannot be categorized, and increases the amount of information that can be categorized.

(4) Categorization Unit 40

When AV data is input, the categorization unit 40 performs matching processing to compare the AV data with existing model data, with use of a feature amount extracted from the AV data, and performs judgment processing for judging whether the AV data matches any models, in the same manner as the categorization unit 4 in Embodiment 1.

In a case where no predefined model is stored in either of the basic dictionary DB 5 and the local dictionary DB 10, the categorization unit 40 does not perform the aforementioned processing and stores, in the all image feature DB 41, the non-categorization information of the AV data targeted for calculation of a feature amount by the feature amount extraction unit 3.

Subsequently, when a local model and a global model are created by the local model creation unit 9 and the global model creation unit 43, respectively, the categorization unit 4 performs the judgment processing on AV data, and provides the AV data with metadata such as tag information.

4.2 Summary

As described above, instead of holding in advance predetermined categorization models, the data processing device 100a automatically creates all categorization models by extracting, from the feature amounts obtained from local AV data, not only feature amounts likely to belong to the same object, but also feature amounts likely to belong to a similar object. As a result, the data processing device 100a can categorize local AV data pieces with use of not only a local model likely to identify the same object, but also a global model likely to identity a similar object, thus enabling automatically defining all categories of objects included in the local AV data pieces, and extracting the model information of the objects.

5. Embodiment 5

The following describes Embodiment 5 according to the present invention, with reference to the drawings.

The present embodiment relates to a method for receiving the specification of a plurality of images from a user at the time of processing for extracting the same feature or creating a local model, and performing the processing based on the received images.

Note that in the present embodiment, components having the same functions as in Embodiments 1 and 3 are given the same reference signs, and descriptions thereof are omitted to avoid redundancy.

Also, unless otherwise described, the structure of each component having the same reference sign, as well as the basic structure of the data processing device, is the same as in Embodiment 1 or 3.

In the present embodiment, a method is employed for accurately extracting a feature specific to the local DB 1 and creating a local model specific to the local DB 1, in consideration of input information of a user by user interaction at the time of input and output steps in the processing procedures, in the same manner as in Embodiment 3.

The following describes in detail a method for extracting the same feature and creating a local model based on the user interaction at the time of input and output steps in image analysis, on the assumption that data used in the present embodiment is mainly images.

5.1 Structure

The following describes a structure of a data processing device 100b according to Embodiment 5, particularly the parts that are different from the structures of Embodiments 1 and 3.

Figure 21:
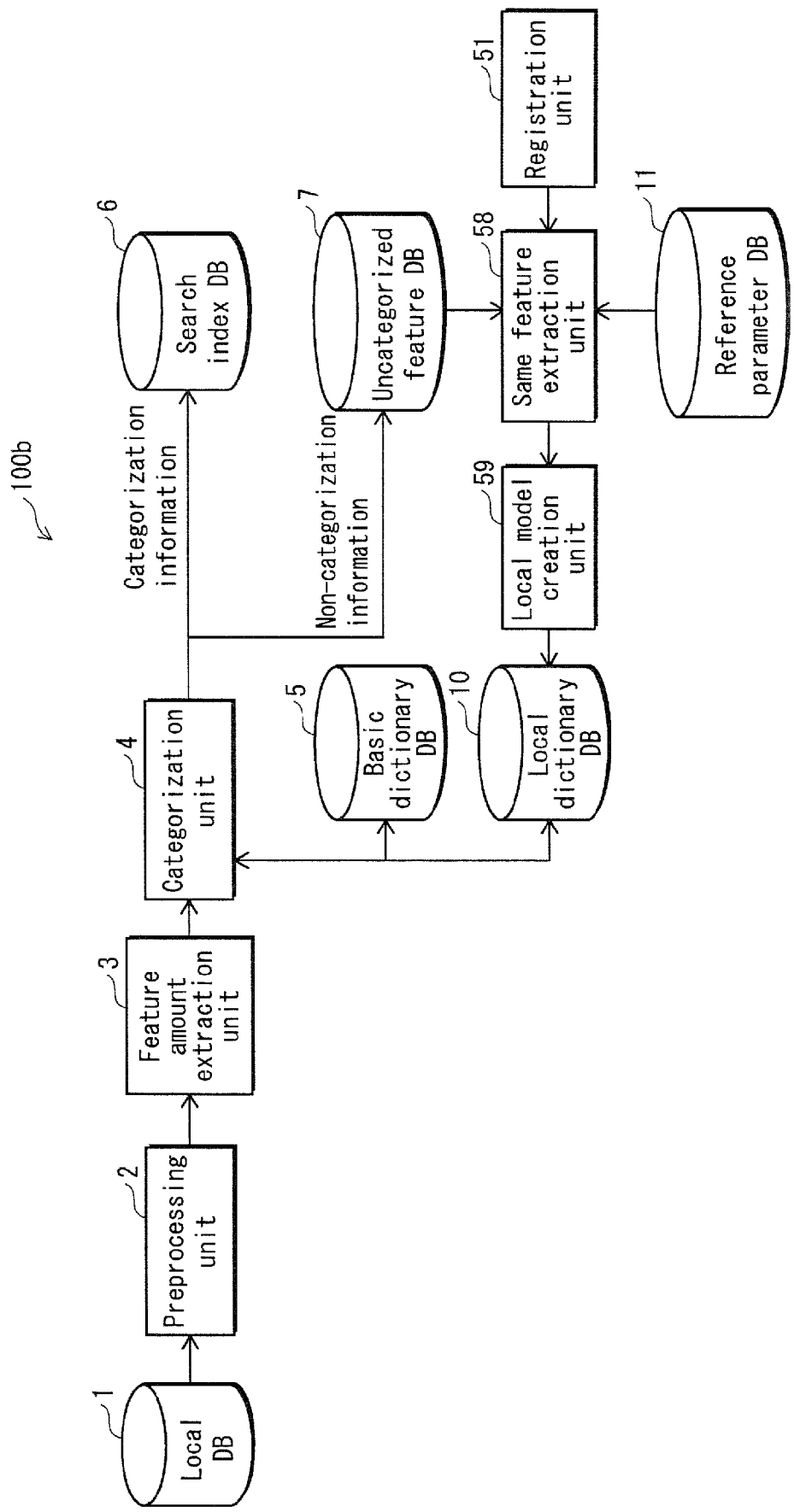
FIG. 21 is a block diagram showing a structure of a data processing device 100b.

As shown in FIG. 21, the data processing device 100b includes the local DB 1, the preprocessing unit 2, the feature amount extraction unit 3, the categorization unit 4, the basic dictionary DB 5, the search index DB 6, the uncategorized feature DB 7, a same feature extraction unit 58, a local model creation unit 59, the local dictionary DB 10, the reference parameter DB 11, and a registration unit 51.

The following describes: a function of the registration unit 51 which is not included in the data processing device according to Embodiment 1; and functions of the same feature extraction unit 58 and the local model creation unit 59 which are different from the functions of the same feature extraction unit 8 and the local model creation unit 9.

(1) Registration Unit 51

The registration unit 51 is provided to improve the accuracy of the processing performed by the same feature extraction unit 58 and the local model creation unit 59. The registration unit 51 receives, from a user, a specification of images the user desires to categorize and an instruction for creating a local model based on the specified images.

Specifically, the registration unit 51 displays, for example, the image G100 shown in FIG. 16; the image G200 shown in FIG. 17; and the image G300 shown in FIG. 18, and receives, from the user, the specification of images and the instruction for creating a local model based on the specified images. In the present embodiment, it is assumed that a screen for displaying images includes a touch panel function, in the same manner as in Embodiment 3.

The following descriptions are provided with use of the images G100, G200, and G300 shown in FIGS. 16, 17, and 18, respectively.

The structure of the image G100 displayed on the screen in the present embodiment is the same as that of Embodiment 3, except that the images targeted for display are different. In the present embodiment, no local model has been created, and the images targeted for display have not yet been subjected to categorization.

The other parts of the image G100, for example, the library G101, the checkboxes C100, C101, C102, C103, etc., the buttons B100, B101, B102, and B103, and the scroll bar SB100, are the same as those in Embodiment 3. Therefore, descriptions thereof are omitted here.

For example, when the image G100 is displayed, the user can easily select images to be registered, with use of the scroll bar SB100.

When the button B300 in the image G300 is pressed, a local model created by the same feature extraction unit 58 and the local model creation unit 59 is registered in the local dictionary DB 10. Descriptions of the same feature extraction unit 58 and the local model creation unit 59 are described later.

(2) Same Feature Extraction Unit 58

The same feature extraction unit 58 extracts the same feature from the images specified by the user using the registration unit 51.

Specifically, when a plurality of images in the image G100 are checked and the button B100 is pressed, the images are categorized into groups of images that are similar in image-capturing time. In other words, the images are categorized in a unit of event.

The same feature extraction unit 58 extracts the same feature from each group of images that are categorized. Since the method for extracting the same feature is the same as the method used by the same feature extraction unit 8 in Embodiment 1, descriptions thereof are omitted here.

(3) Local Model Creation Unit 59

The local model creation unit 59 creates a local model for each of the same features extracted from the respective groups of images that are categorized by the same feature extraction unit 58.

Since the method for creating a local model is the same as the method used by the local model creation unit 59 in Embodiment 1, descriptions thereof are omitted here.

5.2 Operation

Figure 22:
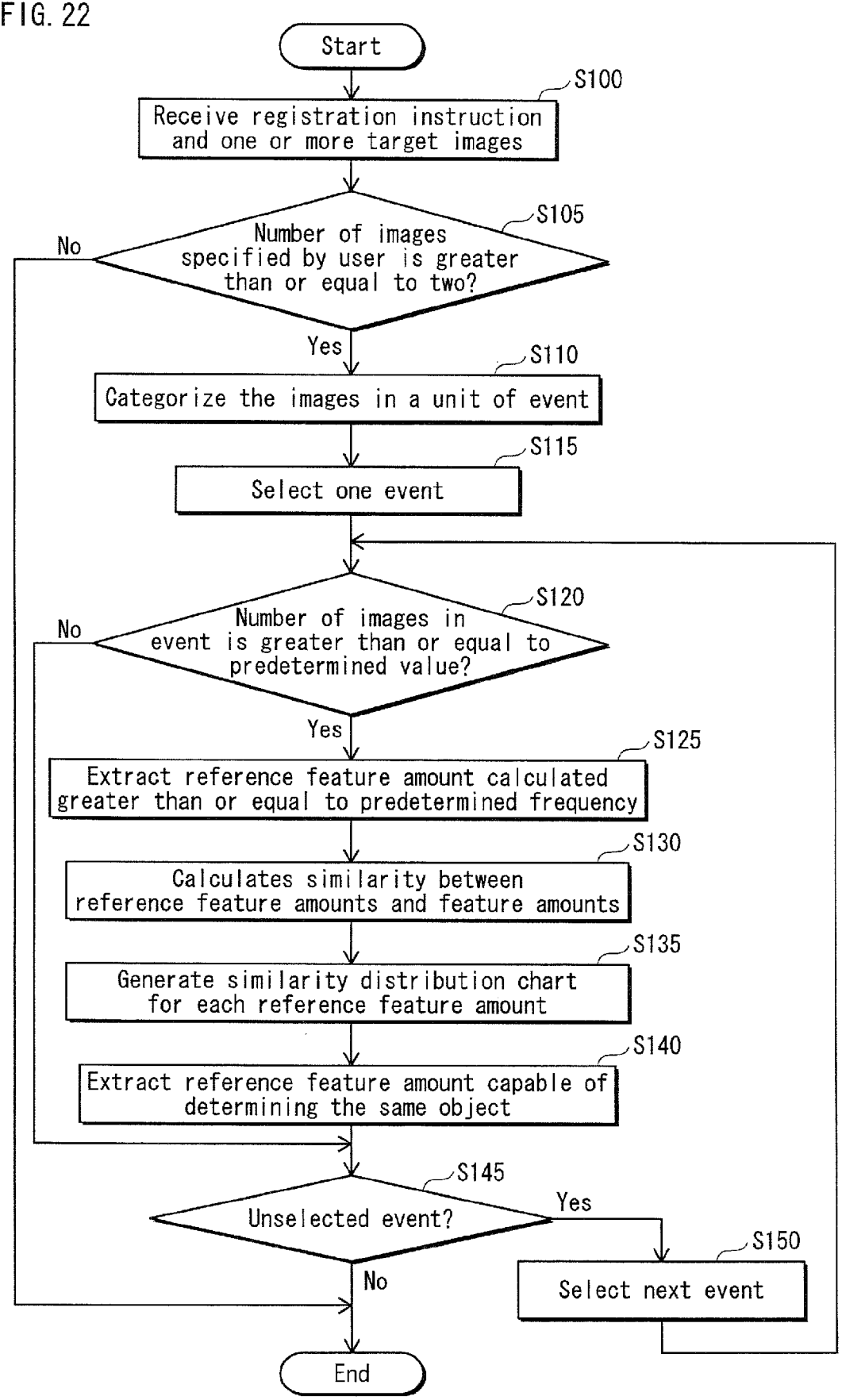
FIG. 22 is a flowchart showing processing in which the data processing device 100b calculates the same feature amount.

The following describes processing in which the data processing device 100b extracts the same feature from a group of images specified by the user, with reference to the flowchart of FIG. 22.

The registration unit 51 receives an instruction for registration and a specification of one or more images targeted for the registration (step S100). Specifically, the registration unit 51 receives the instruction for registration and the specification of one or more images, when the one or more images are checked in the image G100 and thereafter the button B100 is pressed.

When the instruction for registration and the specification of the one or more images are received by the registration unit 51, the same feature extraction unit 58 judges whether the number of the received images is greater than or equal to two (step S105).

When judging that the number of the received images is not greater than or equal to two ("No" in step S105), the data processing device 100b ends the processing.

When judging that the number of the received images is greater than or equal to two ("Yes" in step S105), the same feature extraction unit 58 categorizes the images in a unit of event (step S110).

The same feature extraction unit 58 selects one event (step S115).

The same feature extraction unit 58 judges whether the number of images included in the selected event is greater than or equal to a predetermined value (step S120).

When judging that the number of images included in the selected event is greater than or equal to the predetermined value ("Yes" in step S120), the same feature extraction unit 58 extracts, from the images included in the event, a reference feature amount that is calculated greater than or equal to a predetermined frequency (step S125). The type of feature amount may be any feature amount extracted by the feature amount extraction unit 3. For example, color information and a high level SIFT feature amount may be combined for use. Here, the type of feature amount is assumed to be a SIFT feature amount. It is possible to identify and extract a reference feature amount under a certain condition. For example, the certain condition may be that the reference feature amount exists in more than half of all the images that include SIFT feature amounts or the like that are similar to a degree greater than or equal to a predetermined threshold value.

Figure 23:
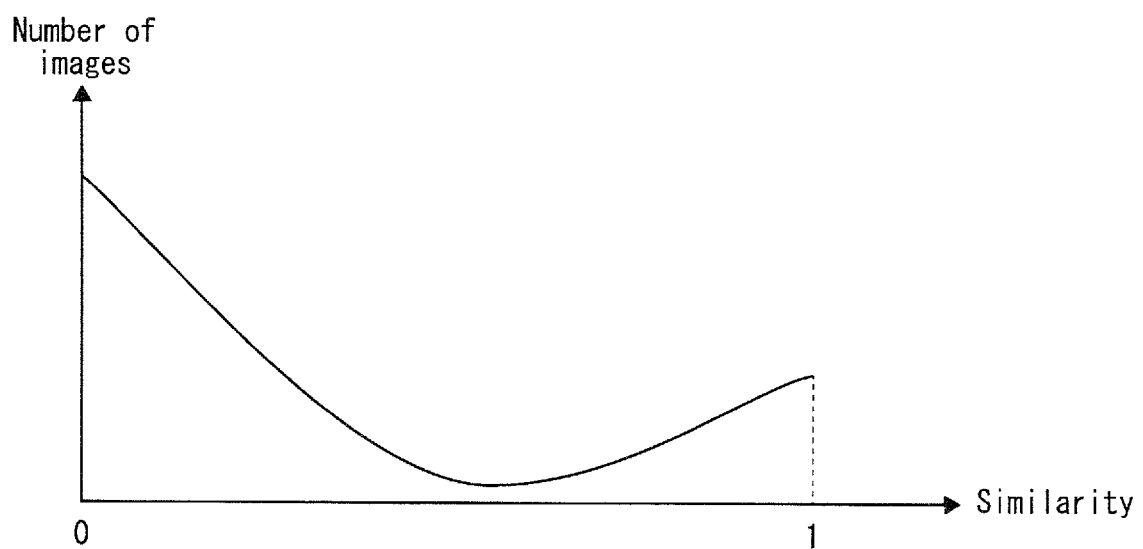
FIG. 23 shows an example of a similarity distribution chart created from the similarity between the reference feature amounts and the feature amounts of all uncategorized images.

The same feature extraction unit 58 calculates, for each of the reference feature amounts that have been extracted, the similarity between the reference feature amount and the feature amounts in all images (step S130). For example, when the feature amounts in all images are SIFT feature amounts, the same feature extraction unit 58 calculates, as similarity, the distance from each of the reference feature amounts to each of the SIFT feature amounts in all the image data pieces. The same feature extraction unit 58 creates, for each reference feature amount, a similarity distribution chart by normalizing the similarity between the reference feature amount and each of the SIFT feature amounts in all images that have not been categorized between "0" (no match) and "1" (perfect match), for example (step S135). Suppose that any of the similarity distribution charts shows a high percentage both in the vicinity of "0" and in the vicinity of "1", as shown by the similarity distribution chart shown in FIG. 23. In this case, the same feature extraction unit 58 judges that the reference feature amount corresponding to the similarity distribution chart can determine the same object, extracts the reference feature amount (step S140), and outputs, to the local model creation unit 9, the reference feature amount as the same feature.

The same feature extraction unit 58 judges whether there is an unselected event (step S145).

When judging that there is an unselected event ("Yes" in step S145), the same feature extraction unit 58 selects the next event (step S150), and returns to step S120.

When judging that there is no unselected event ("No" in step S145), the data processing device 100b ends the processing.

After the aforementioned processing is completed, the local model creation unit 59 creates a local model for each event, with use of the same features that have been extracted.

5.3. Modifications in Embodiment 5

Although an example of the present invention has been described based on Embodiment 5, the present invention is not limited to such. For example, the following modifications are possible.

(1) In Embodiment 5 described above, the same feature extraction unit 58 groups the specified images into units of events. However, it is not limited to such.

The same feature extraction unit 58 may extract a plurality of same features from the specified images, without grouping the specified images into units of events.

Then, the local model creation unit 59 may group the plurality of same features that have been extracted into units of events. Alternatively, the local model creation unit 59 may create a local model from the plurality of same features that have been extracted, without grouping the same features into units of events.

(2) In Embodiment 5 described above, the local model creation unit 59 creates a local model for each event. However, it is not limited to such.

The local model creation unit 59 may create a local model with use of all the same features that have been extracted in units of events. In this case, the local model creation unit 59 may extract only the feature common to the local models each created for an event, and create a core part of the local models based on the common feature that has been extracted. Furthermore, the local model creation unit 59 may calculate a difference between the core part of the local models and each of the local models, and thereby extract a change in the tendency of the local models or create a new local model suitable for (i) the change in the tendency and (ii) the tendency of the images in all of the events.

Alternatively, the local model creation unit 59 may create a local model for each event, and create a local model for an unselected event based on two of the events. Here, the unselected event exists between the two events, and is not specified from images selected by a user. For example, in a case where the images selected by the user are grouped by two events shown by the sections 1 and 3 in FIG. 11, the local model creation unit 59 creates a local model for each of the sections 1 and 3, and also creates a local model for the section 2 (section not selected by the user) that exists between the sections 1 and 3, based on the local models of the sections 1 and 3.

Also, the local model creation unit 59 may weight local models for two events for use, and thereby create a local model for an unselected event. For example, assume the following conditions: the selected events are the sections 1 and 3, and the unselected event is the section 2 as described above; and a difference between the sections 1 and 2 is two days, and a difference between the sections 2 and 3 is three days. In this case, the local model creation unit 59 calculates the local model (Z) of the section 2, with use of a formula "$Z = X \times (3/5) + Y \times (2/5)$", where X denotes the local model (X) of the section 1, and Y denotes the local model (Y) of the section 3.

(3) In Embodiment 5 described above, when giving an instruction for registration, the user may specify images for each of the orientations of the objects included in the images.

For example, when selecting a pet or a person for creating a local model, the user may select images depending on the angles at which the images were captured, i.e., images of the pet or the person from the front, the right-side, the left-side, etc.

The same feature extraction unit 58 extracts the same feature for each image-capturing angle.

(4) In Embodiment 5 described above, the same feature extraction unit 58 groups images in units of events. However, it is not limited to such.

The user may divide images into image groups in units of events, and select images from each image group.

(5) According to Embodiment 5 described above, in a case where no local model has been created, the data processing device displays only the images that have not yet been categorized. However, it is not limited to such.

In the case where no local model has been created, images to be displayed may be included in a library targeted for display, regardless of whether the images have been categorized or not.

(6) The present invention may be any combination of the aforementioned Embodiment 5 and the modifications thereof.

5.4 Summary

As described above, the local model creation unit 59 creates a local model for each event (e.g., each section shown in FIG. 11), and judges whether the local model has time continuity within a group of images specified by the user. For example, assume that the images specified by the user are included in the sections 1, 2, and 6 shown in FIG. 11. In this case, the local model creation unit 59 creates a local model for each of the sections 1, 2, and 6, based on all of the images in the sections 1, 2, and 6, including the images specified by the user. In this way, the local model creation unit 59 can create a local model that is to be registered, and that is optimal for the tendency of the images included in all of the sections 1, 2, and 6 (e.g., a histogram showing an average color of the images, the content percentage of a characteristic object, the type of scene, etc.).

Also, in a case where, for example, the images specified by the user are only included in the section 3 shown in FIG. 11, it is highly likely that the images are captured in one event. Therefore, it is possible to create a local model optimized only for the section 3. Furthermore, it is possible to extract the same feature in each section so as to limit the feature amounts for use.

6 Modification

Although descriptions have been provided based on the above embodiments, the present invention is not limited to such. For example, the following modifications are possible.

(1) In the above embodiments, the discriminator used by the categorization unit 4 in the judgment processing uses a machine learning method. However, it is not limited to such. The discriminator may use any method as long as it can discriminate, according to a criterion for discrimination, a defined categorization item to which a signal having a feature amount belongs.

(2) The reference feature amounts used by the present invention may be any feature amounts as long as they can identify a characteristic feature amount from among the feature amounts of the AV data extracted by the feature amount extraction unit 3.

For example, in the case of images, partial feature amounts, such as Visual Words in a BoF (Bag of Features), may be used. Also, in the case of audio, the utterance models of vowels and consonants, which are language basic models, may be used.

(3) In the above embodiments, the processing for extracting the same feature is started based on, for example, the first reference parameter table T100. However, the conditions for starting the processing are not limited to those in the first reference parameter table T100.

The number of data pieces for starting the processing may be determined depending on increase or decrease in the number of uncategorized data pieces as a result of categorization, and may be any number as long as it is sufficient for starting the processing. For example, the data processing device may perform the processing for extracting the same feature depending simply on increase or decrease in the total number of uncategorized data pieces. Alternatively, the data processing device may start the processing when at least two of the criteria in the first reference parameter table T100 are satisfied.

(4) In the above embodiments, each of the same feature extraction units 8 and 58 may calculate, for each image data piece, the detection count of each feature amount as shown in FIG. 3, and then calculate the detection counts for each predetermined section.

(5) In the above embodiments, the values of the detection counts in each similarity distribution chart may be normalized between 0 and 1. This simplifies the calculation processing.

(6) In the above embodiments, when a reference feature amount satisfies any of the peak value criteria in the second reference parameter table T110, each of the same feature extraction units 8 and 58 judges that the reference feature amount can determine the same object. However, it is not limited to such.

Each of the reference feature amounts for use may be associated with a different peak value criterion.

(7) In Embodiment 3 described above, images are selected with use of the checkboxes, as shown by the example in FIG. 16. However, it is not limited to such.

It is possible to select images by directly touching the images.

According to the example of FIG. 17, the user selects one object (i.e., chair) and inputs tag information for the object. However, the user may select a plurality of objects in one image, and input tag information for each of the selected objects.

In other words, the method for user interaction may be any method as long as it enables correcting a result of processing by the same feature extraction unit 8 and the local model creation unit 9.

(8) In Embodiment 1 described above, the uncategorized feature DB 7 stores, as non-categorization information, an identifier for identifying AV data. However, it is not limited to such.

The uncategorized feature DB 7 may store, as non-categorization information, a feature amount of AV data that is calculated by the feature amount extraction unit 3.

(9) In the above embodiments, descriptions are provided focusing on the case where AV data pieces are images. However, the AV data pieces may be something other than images.

For example, the data processing device may create a local model based on audio.

In other words, the AV data may be any data as long as it includes a feature based on which a local model can be created.

Also, the data processing device according to the present invention may be mounted in a device capable of storing data from which a local model can be created, such as a DVD recorder, a TV, a personal computer, or a data server.

(10) In the above embodiment, the feature amount extraction unit extracts at least one of the following feature amounts: (i) a low level feature amount, such as an edge, color, or texture; (ii) a feature amount descriptor, such as SURF or SIFT, which indicates the feature amount of an area centering a feature point; (iii) a high level feature, such as HOG (histogram of oriented gradient), which indicates a feature pertaining to the shape of an object; and the like. However, it is not limited to such.

The feature amount extraction unit may create a feature group including groups of local features that are similar in edge, color, texture, or the like. At this time, the same feature extraction unit calculates the similarity in feature amounts, the frequency of appearance of each feature amount, etc. from each group of the local features included in the created feature amount.

(11) The processing procedures described in the above embodiments may be written in a program to be stored in a memory. Then, a CPU (Central Processing Unit) or the like may read the program from the memory and execute the program, so as to realize the processing procedures.

Also, the program in which the processing procedures are written may be stored on a recording medium to be distributed.

(12) Each component according to the above embodiments may be realized by an LSI (Large Scale Integration) which is an integrated circuit. Each of the components may be individually realized as one chip. Also, some or all components may be realized as one chip. Here, the LSI may be an IC (Integrated Circuit), a system LSI, a super LSI, or an ultra LSI, depending on the degree of integration. A method of circuit integration is not limited to an LSI, but may be realized by a dedicated circuit or a general processor. Also, it is possible to use an FPGA (Field Programmable Gate Array) that is programmable after the LSI is produced, or a reconfigurable processor that allows the reconfiguration of the connection and setting of circuit cells in the LSI. The computation of these functional blocks may be performed with use of, for example, a DSP (Digital Signal Processor) or a CPU. Furthermore, the processing steps of the functional blocks may be implemented as a program. The program may be recorded onto a recording medium, and executed by a computer.

Furthermore, if an integration technique that replaces LSIs emerges as a result of the advance of a semiconductor technique or a derivative technique, such a technique may of course be used to integrate functional blocks. For example, biotechnology may be employed as such a technique.

(13) The present invention may be any combination of the above embodiments and modifications.

[Industrial Applicability]

The data processing device of the present invention is useful in categorizing data not identifiable by a general model, and creating a local model specific to a user.

Also, the data processing device of the present invention not only creates a local model in a distance space using all feature amounts, but also (i) limits the feature amounts to only those likely to identify the same object, and (ii) creates a local model in view of time continuity by dividing local AV data pieces into data groups in units of predetermined sections. This enables creating a local categorization model having a high capability in identifying a local AV data piece, compared to a general categorization model. Accordingly, information pieces indicating objects specific to local AV data pieces are accurately extracted and used as the indexes of the local AV data pieces. This allows a user to easily categorize or search for the AV data pieces. For example, suppose that at the time of image search, images are not accurately categorized by general categorization models. Even in such a case, the data processing device performs image processing for creating local categorization models specific to the local images of the user, and categorizing the local images using the local models. Accordingly, the data processing device of the present invention is useful as various image viewing terminals or the like. Also, the data processing device is applicable to a DVD recorder, a TV (Television), computer software, a data server, or the like.

REFERENCE SIGNS LIST

1 Local DB
2 Preprocessing Unit
3 Feature Amount Extraction Unit
4 Categorization Unit
5 Basic Dictionary DB
6 Search Index DB
7 Uncategorized Feature DB
8 Same Feature Extraction Unit
9 Local Model Creation Unit
10 Local Dictionary DB
11 Reference Parameter DB
20 Local Model Creation Unit
21 Section Information Extraction Unit
22 Section Model Creation Unit
23 Model Continuity Judgment Unit
30 User Interaction Input Unit
40 Categorization Unit
41 All image feature DB
42 Similar Feature Extraction Unit
43 Global Model Creation Unit
100 Data Processing Device

The invention claimed is:

1. A data processing device for categorizing objects included in target data pieces with use of feature amounts of the objects, the data processing device comprising:
  a hardware processor; and
  a storage unit storing therein a plurality of model data pieces used for categorizing the objects, each of the model data pieces indicating detection counts of respective feature amounts, each detection count indicating a number of times the corresponding feature amount is detected,
  wherein the hardware processor executes a program stored in a memory to perform:
    a categorization function of judging, for each target data piece, whether the target data piece is a non-categorization data piece including an object that is uncategorizable, with use of the model data pieces and the detection count of each of at least two feature amounts detected in the target data piece;
    a specification function of, when, as a result of the judgment by the categorization function, two or more of the target data pieces are judged to be non-categorization data pieces, specifying at least two feature amounts that are each included and detected the same number of times, in a predetermined number or more of the non-categorization data pieces; and
    a model creation function of newly creating a model data piece based on the at least two feature amounts specified by the specification function, with use of a class creation method, and of storing the newly created model data piece into the storage unit.

2. The data processing device of claim 1, wherein the specification function:
  acquires, for each non-categorization data piece, the detection counts of similar feature amounts included in the non-categorization data piece, each similar feature amount being similar to any of feature amounts indicated by the model data pieces;
  generates, for each feature amount, a distribution information piece indicating a distribution of the detection counts of the feature amount, based on the detection counts of the similar feature amounts acquired for the non-categorization data pieces; and
  specifies, from the distribution information pieces, the at least two feature amounts that are each included and detected the same number of times, in the predetermined number or more of the non-categorization data pieces.

3. The data processing device of claim 2, wherein
  the specification function divides the non-categorization data pieces into a plurality of data groups in units of predetermined sections and, for each data group, acquires the detection counts, generates the distribution information pieces, and specifies the at least two feature amounts, and the model creation function newly creates a model data piece for each data group.

4. The data processing device of claim 3, wherein
each non-categorization data piece is associated with a time information piece indicating a date and time at which the non-categorization data piece was created,
each of the predetermined sections is a predetermined time period, and
the specification function divides the non-categorization data pieces into the data groups in units of the predetermined time periods.

5. The data processing device of claim 4, wherein
after newly creating the model data pieces for the data groups, the model creation function judges whether first and second model data pieces are correlated in a time sequence, the first model data piece being created for one of the data groups, the second model data piece being created for another one of the data groups, and when judging affirmatively, associates the first model data piece with the second model data piece as model data pieces having a secular change.

6. The data processing device of claim 5, wherein
the model creation function judges that the first and the second model data pieces are correlated when a degree of temporal change in a first feature amount characterizing the first model data piece is proportional to a degree of temporal change in a second feature amount characterizing the second model data piece.

7. The data processing device of claim 5, wherein
the model creation function stores only the first model data piece into the storage unit, when the first model data piece is the same as the second model data piece or when model data pieces each being the same as the first model data piece exist at intervals in remaining model data pieces that are other than the first model data piece.

8. The data processing device of claim 2, wherein the specification function:
acquires a calculation frequency of each feature amount with use of all non-categorization data pieces, specifies at least one feature amount whose calculation frequency is greater than or equal to a predetermined frequency, and acquires, for each non-categorization data piece, the detection count of each of the at least one feature amount; and
generates the distribution information piece for each feature amount that has been acquired, based on the detection counts of the feature amount.

9. The data processing device of claim 2,
wherein the hardware processor executes the program stored in the memory to further perform:
a display function of displaying the non-categorization data pieces; and
a reception function of receiving, from a user, a specification of at least two of the non-categorization data pieces displayed by the display function, and
wherein the specification function generates the distribution information pieces for the respective feature amounts, based on one of (i) the detection counts of the feature amounts acquired for each of the at least two non-categorization data pieces received by the reception function and (ii) the detection counts of the feature amounts acquired for each of remaining non-categorization data pieces that are other than the at least two non-categorization data pieces.

10. The data processing device of claim 9, wherein
the reception function receives the specification when a new model data piece has not yet been created.

11. The data processing device of claim 10, wherein
the specification function (i) divides the at least two non-categorization data pieces into a plurality of data groups in units of time periods, based on a date and time at which each of the at least two non-categorization data pieces was created, the dividing being performed such that each of the dates and times belongs to one of the time periods, and (ii) generates the distribution information pieces for each data group.

12. The data processing device of claim 2,
wherein the hardware processor executes the program stored in the memory to further perform:
a display function of displaying a plurality of data pieces estimated to include an object identified by the newly created model data piece; and
a reception function of receiving, from a user, a specification of at least two of the data pieces displayed by the display function,
wherein the specification function generates, for each feature amount, a different distribution information piece of the detection counts of the feature amount, based on one of (i) the detection counts of the feature amounts acquired for each of the at least two data pieces received by the reception function and (ii) the detection counts of the feature amounts acquired for each of remaining data pieces that are other than the at least two data pieces, the different distribution information pieces being different from the distribution information pieces generated based on the detection counts acquired for the non-categorization data pieces, and
wherein the model creation function creates a model data piece different from the newly created model data piece, based on the different distribution information pieces.

13. The data processing device of claim 2, wherein
the target data pieces are images, and
the specification function creates, for each image including an object that is not identifiable by the model data pieces, a high level feature group at least including a plurality of local feature groups with use of a similarity between at least one feature amount detected in the image and any of the feature amounts indicated by the model data pieces, and acquires, for each local feature group, the detection count of each similar feature amount.

14. A data processing method used in a data processing device for categorizing objects included in target data pieces with use of feature amounts of the objects, the data processing device comprising a storage unit storing therein a plurality of model data pieces used for categorizing the objects, each of the model data pieces indicating detection counts of respective feature amounts, each detection count indicating a number of times the corresponding feature amount is detected, the data processing method comprising the steps of:
a categorization step of judging, for each target data piece, whether the target data piece is a non-categorization data piece including an object that is uncategorizable, with use of the model data pieces and the detection count of each of at least two feature amounts detected in the target data piece;
a specification step of when, as a result of the judgment by the categorization step, two or more of the target data pieces are judged to be non-categorization data pieces, specifying at least two feature amounts that are each included and detected the same number of times, in a predetermined number or more of the non-categorization data pieces; and
a model creation step of newly creating a model data piece based on the at least two feature amounts specified by the specification step, with use of a class creation method, and of storing the newly created model data piece into the storage unit.

15. A non-transitory computer-readable recording medium having a program recorded thereon, the program being used in a data processing device for categorizing objects included in target data pieces with use of feature amounts of the objects, the data processing device comprising a storage unit storing therein a plurality of model data pieces used for categorizing the objects, each of the model data pieces indicating detection counts of respective feature amounts, each detection count indicating a number of times the corresponding feature amount is detected, the program causing the data processing device to execute a method comprising:

a categorization step of judging, for each target data piece, whether the target data piece is a non-categorization data piece including an object that is uncategorizable, with use of the model data pieces and the detection count of each of at least two feature amounts detected in the target data piece;

a specification step of when, as a result of the judgment by the categorization step, two or more of the target data pieces are judged to be non-categorization data pieces, specifying at least two feature amounts that are each included and detected the same number of times, in a predetermined number or more of the non-categorization data pieces; and a model creation step of newly creating a model data piece based on the at least two feature amounts specified by the specification step, with use of a class creation method, and of storing the newly created model data piece into the storage unit.

16. An integrated circuit used in a data processing device for categorizing objects included in target data pieces with use of feature amounts of the objects, the integrated circuit comprising:

a storage unit storing therein a plurality of model data pieces used for categorizing the objects, each of the model data pieces indicating detection counts of respective feature amounts, each detection count indicating a number of times the corresponding feature amount is detected;

a categorization unit judging, for each target data piece, whether the target data piece is a non-categorization data piece including an object that is uncategorizable, with use of the model data pieces and the detection count of each of at least two feature amounts detected in the target data piece;

a specification unit when, as a result of the judgment by the categorization unit, two or more of the target data pieces are judged to be non-categorization data pieces, specifying at least two feature amounts that are each included and detected the same number of times, in a predetermined number or more of the non-categorization data pieces; and a model creation unit newly creating a model data piece based on the at least two feature amounts specified by the specification unit, with use of a class creation method, and storing the newly created model data piece into the storage unit.

\* \* \* \* \*